(12) United States Patent
Jalali et al.

(10) Patent No.: US 8,848,548 B2
(45) Date of Patent: Sep. 30, 2014

(54) INTERNET RADIO BROADCAST USING CELLULAR

(75) Inventors: Ahmad Jalali, Rancho Santa Fe, CA (US); Leonard N. Schiff, San Diego, CA (US); William G. Ames, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 930 days.

(21) Appl. No.: 12/535,537

(22) Filed: Aug. 4, 2009

(65) Prior Publication Data

US 2011/0032832 A1      Feb. 10, 2011

(51) Int. Cl.
| | |
|---|---|
| H04L 12/26 | (2006.01) |
| H04N 21/6405 | (2011.01) |
| H04L 29/06 | (2006.01) |
| H04W 28/12 | (2009.01) |
| H04L 12/801 | (2013.01) |
| H04W 28/22 | (2009.01) |
| H04N 21/414 | (2011.01) |
| H04L 12/853 | (2013.01) |
| H04L 12/825 | (2013.01) |
| H04N 21/61 | (2011.01) |
| H04N 21/44 | (2011.01) |
| H04N 21/6408 | (2011.01) |
| H04L 12/835 | (2013.01) |
| H04N 21/234 | (2011.01) |
| H04N 21/6373 | (2011.01) |
| H04W 4/06 | (2009.01) |
| H04H 60/91 | (2008.01) |
| H04H 20/71 | (2008.01) |
| H04W 24/00 | (2009.01) |
| H04W 8/24 | (2009.01) |

(52) U.S. Cl.
CPC ..... *H04N 21/23406* (2013.01); *H04N 21/6405* (2013.01); *H04W 4/06* (2013.01); *H04H 60/91* (2013.01); *H04L 65/4076* (2013.01); *H04W 28/12* (2013.01); *H04L 47/10* (2013.01); *H04W 28/22* (2013.01); *H04H 20/71* (2013.01); *H04N 21/41407* (2013.01); *H04L 47/2416* (2013.01); *H04L 47/15* (2013.01); *H04W 24/00* (2013.01); *H04L 47/14* (2013.01); *H04L 47/263* (2013.01); *H04N 21/6125* (2013.01); *H04N 21/44004* (2013.01); *H04N 21/6408* (2013.01); *H04L 47/30* (2013.01); *H04N 21/6373* (2013.01); *H04W 8/24* (2013.01); *H04N 21/6131* (2013.01)
USPC .............................. 370/252; 70/255; 70/390

(58) Field of Classification Search
CPC ..... H04L 45/16; H04L 45/42; H04L 12/5693; H04L 41/20; H04L 41/50; H04L 45/38; H04L 47/50; H04L 12/18; H04L 12/185; H04L 41/12; H04L 45/02; H04L 65/4076; H04L 12/189; H04L 2001/0093; H04L 12/1868; H04L 12/1877; H04L 41/0813; H04L 49/201; H04L 65/80; H04L 12/5695; H04L 41/668; H04L 41/0853; H04L 41/0893; H04L 41/0896; H04L 43/00; H04L 45/123; H04L 45/14; H04L 47/20; H04L 47/24; H04L 47/2416; H04L 47/806; H04W 4/06; H04W 72/005; H04W 72/0406; H04W 72/04; H04W 24/08; H04N 21/6405; H04N 21/6408; H04H 20/26; H04H 20/71; H04H 60/91
USPC ......... 370/229, 230, 232, 252, 253, 351, 390, 370/412, 429, 432; 710/52
See application file for complete search history.

(56) References Cited

U.S. PATENT DOCUMENTS 7,296,091 B1 11/2007 Dutta et al.
2004/0193762 A1* 9/2004 Leon et al. ...................... 710/52

(Continued)

FOREIGN PATENT DOCUMENTS

CN 101203827 A 6/2008
EP 2040492 3/2009

(Continued)

OTHER PUBLICATIONS

International Search Report and Written Opinion—PCT/US2010/044458, International Search Authority—European Patent Office Nov. 18, 2010.

(Continued)

*Primary Examiner* — Yemane Mesfin
*Assistant Examiner* — Mon Cheri Davenport

(57) ABSTRACT

Aspects describe utilizing the Internet capability in mobile devices/networks to deliver broadcast multimedia to a device. The broadcast can be video, audio, and so forth. Initially the broadcast multimedia is transmitted at high data rates (and in unicast mode) in order for a buffer associated with mobile device to be built to a very long buffer length. When the long buffer length is reached, the multimedia can be delivered at real-time rates. The multimedia delivered at real times rates can be unicast mode or in multicast mode. If the buffer is depleted, a mobile device that is part of a multicast group can autonomously disassociated from the group until the buffer length is restored.

40 Claims, 14 Drawing Sheets

(56) References Cited

U.S. PATENT DOCUMENTS

2006/0282566 A1* 12/2006 Virdi et al. ............... 710/52
2007/0127437 A1   6/2007 Ozawa
2007/0192812 A1*  8/2007 Pickens et al. ........... 725/94
2008/0081634 A1*  4/2008 Kaikkonen et al. ...... 455/452.1

FOREIGN PATENT DOCUMENTS

| JP | 2004153618 A | 5/2004 |
| JP | 2008543176 A | 11/2008 |
| KR | 20050106592 A | 11/2005 |
| KR | 20080016817 A | 2/2008 |
| WO | WO2004072766 | 8/2004 |
| WO | 2005039180 A1 | 4/2005 |
| WO | 2006127391 A2 | 11/2006 |

OTHER PUBLICATIONS

Ollikainen V, et al., "A handover approach to DVB-H services" IEEE International Conference on Multimedia and EXPO (ICME 2006), 2006, pp. 629-632, XP002604439 IEEE Piscataway, NJ, USA ISBN: 1-4244-0366-9 the whole document.

* cited by examiner

INTERNET RADIO BROADCAST USING CELLULAR

BACKGROUND

I. Field

The following description relates generally to wireless communications systems and more particularly to utilizing Internet to communicate broadcast multimedia.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and other systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams carried by the composite stream. Likewise, a mobile terminal can transmit data to the base station or another mobile terminal.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect relates to a method for receiving broadcast multimedia. Method can include employing a processor to implement the method. Method includes receiving a first set of packets of the broadcast multimedia at a mobile device at a first data rate and monitoring a buffer length. The transmission is in a unicast mode. Further, method includes sending a first notification when the buffer length is at or above a first threshold length and receiving at the mobile device a second set of packets at a second data rate.

Another aspect relates to a communications apparatus that includes a memory and a processor. Memory retains instructions related to requesting a broadcast multimedia, wherein the broadcast multimedia comprises a plurality of packets. Memory also retains instructions related to receiving a first subset of the plurality of packets at a first data rate and monitoring a buffer length. Further, memory retains instructions related to sending a first notification when the buffer length is at or above a first threshold length and receiving a second subset of the plurality of packets at a second data rate. The processor is coupled to the memory and is configured to execute the instructions retained in the memory.

Another aspect relates to a communications apparatus that receives broadcast multimedia in a communications network. Communications apparatus includes means for requesting the broadcast multimedia, wherein the broadcast multimedia comprises a plurality of packets. Communications apparatus also includes means for receiving a first subset of the plurality of packets in a unicast mode at a first data rate, means for monitoring a buffer length, and means for sending a first notification when a buffer length is at or above a threshold length. Further, communications apparatus includes means for receiving a second subset of the plurality of packets at a second data rate. In accordance with some aspects, communications apparatus includes means for selectively disassociating from a multicast group if the buffer length drops below the first threshold length. Alternatively or additionally, communications apparatus can include means for conducting handoff and means for joining a multicast group.

Yet another aspect relates to a computer program product, comprising a computer-readable medium. Included in computer-readable medium is a first set of codes for causing a computer to receive a first subset of a plurality of broadcast multimedia packets at a first data rate. Also included in computer-readable medium is a second set of codes for causing the computer to transmit a message that indicates a buffer length has reached or exceeded a first threshold length and a third set of codes for causing the computer to receive a second subset of the plurality of broadcast multimedia packets at a second data rates. Further, computer readable medium includes a fourth set of codes for causing the computer to receive a third subset of the plurality of broadcast multimedia packets at the first data rate if the buffer length drops below the first threshold length.

Yet another aspect relates to at least one processor configured to receive Internet radio broadcast over a cellular link. Processor includes a first module for receiving from a server a first subset of packets for the Internet radio broadcast over a unicast transmission at a data rate that is higher than a real-time rate and a second module for notifying the server when a buffer length is at or above a threshold length. Processor also includes a third module for receiving a second subset of packets for the Internet radio broadcast at a real-time data rate, wherein the second subset of packets are sent over a unicast mode or a multicast mode.

Still another aspect relates to a method for delivering broadcast multimedia. Method can include employing a processor to implement the method. Method includes receiving from a mobile device a request for the broadcast multimedia and transmitting a first set of broadcast multimedia packets in a unicast mode at a first data rate. Method also includes receiving from the mobile device a first notification that a first buffer threshold length has been reached and transmitting a second set of broadcast multimedia packets at a second data rate.

A further aspect relates to a communications apparatus that includes a memory and a processor. Memory retains instructions related to sending multimedia to a mobile device at a first data rate if a buffer length of the mobile device is below a first threshold length. Memory also retains instructions related to changing the first data rate to a second data rate based on an indication that the buffer length is at or above the first threshold length. The first data rate is sent in a unicast mode. The processor is coupled to the memory and is configured to execute the instructions retained in the memory.

Another aspect relates to a communications apparatus that conveys broadcast multimedia in a communications environment. Communications apparatus includes means for receiving from a mobile device a request for the broadcast multimedia and means for transmitting packets of the broadcast multimedia at a first data rate in a unicast mode. Communications apparatus also includes means for sending a plurality of additional packets of the broadcast multimedia at a second data rate when a buffer length of the mobile device is at or above a first threshold length. In accordance with some aspects, communications apparatus includes means for determining the buffer length of the mobile device is below the first threshold length. According to some aspects, communications apparatus includes means for determining if the mobile device can join a multicast group and means for providing the mobile device an instruction to join the multicast group.

Yet a further aspect relates to a computer program product comprising a computer-readable medium. Included in computer-readable medium is a first set of codes for causing a computer to convey a first subset of packets of a broadcast multimedia to a mobile device at rates that are higher than real-time rates. Also included is a second set of codes for causing the computer to begin to convey a second subset of packets of the broadcast multimedia to the mobile device at the real-time rates if a buffer of the mobile device has reached a threshold length. Also included in computer-readable medium is a third set of codes for causing the computer to automatically convey a third subset of packets of the broadcast multimedia to the mobile device at higher than the real-time rates if the buffer of the mobile device falls below the threshold length.

Another aspect relates to at least one processor configured to transmit broadcast multimedia at variable rates. Processor includes a first module for sending the broadcast multimedia to the device at a high data rate if a buffer length of the device is below a threshold length and a second module for switching the high data rate to a real-time data rate if the buffer length of the device is at or above the threshold length. Processor also includes a third module for selectively allowing the device to join a multicast group, wherein the broadcast multimedia is sent at the high data rate in unicast mode and at the real-time data rate in multicast mode if the device joins the multicast group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
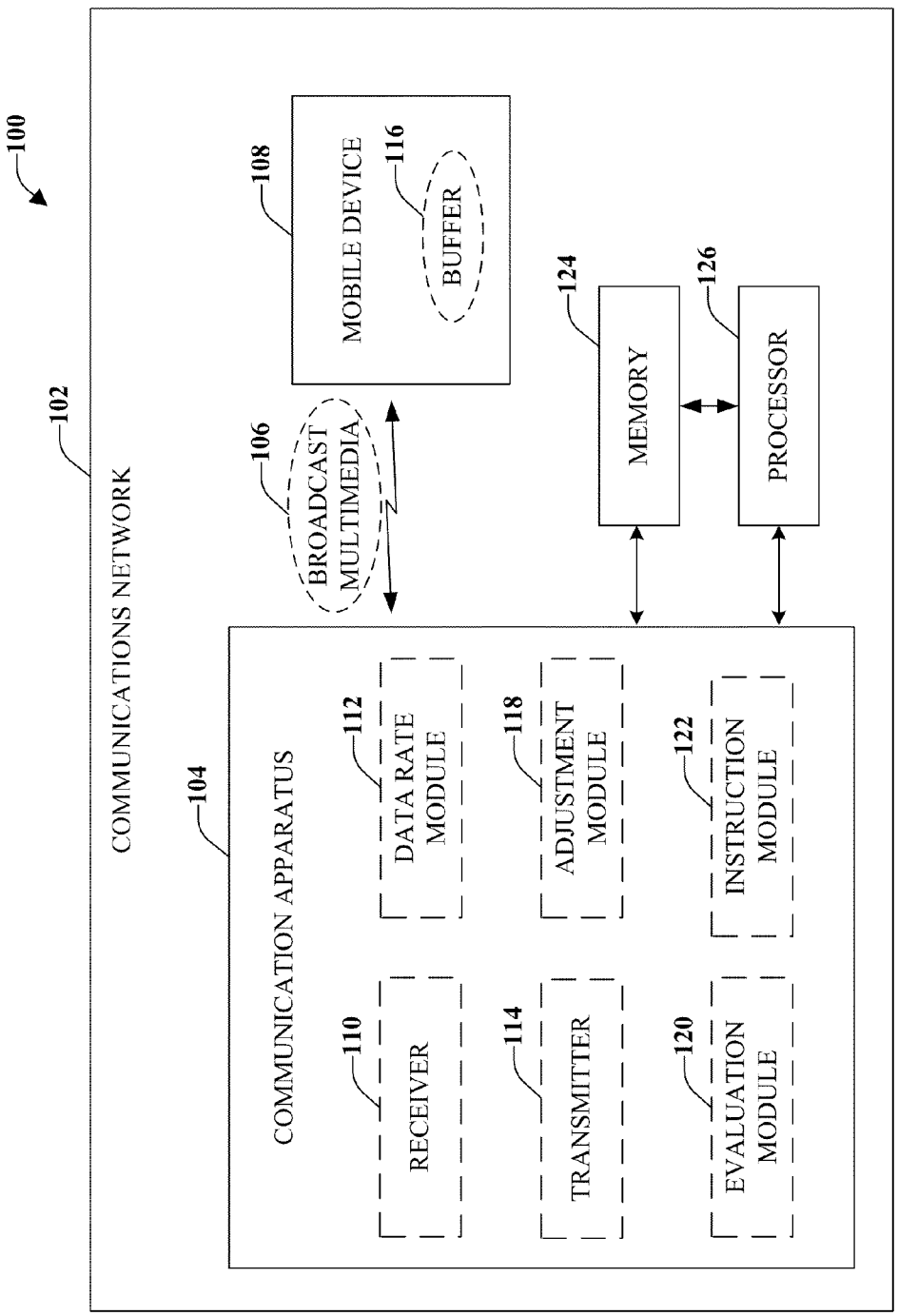
FIG. 1 illustrates a system for transmitting Internet radio broadcast using cellular, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, illustrated is a system 100 for transmitting Internet radio broadcast using cellular, according to an aspect. System 100 is configured to use Internet capability of a mobile device and/or mobile networks to deliver broadcast multimedia to the mobile device. The broadcast can be video, audio, and so on. The device can be any type of mobile device and can be handheld, a car kit unit, as well as others. It should be noted that various examples are provided herein with reference to providing audio to an automobile; however, the disclosed aspects are not limited to this implementation.

Further, the broadcast multimedia can be already stored in a server or servers that mobile device connects to through its URL (Uniform Resource Locator). Live broadcasting can also be performed, provided there is adequate buffering so that nothing is transmitted out of the server until that buffer is full (e.g., one minute of transmission time). System 100 can be configured to handle both constant and variable rate delivery. Further, system 100 can be configured to transmit utilizing multicast mode or unicast mode and can transition between the modes as a function of device status and/or network conditions.

System 100 includes a communications network 102. Included in communications network 102 is a communications apparatus 104, which can be a base station or server that conveys broadcast multimedia 106 to a mobile device 108. It should be understood that system 100 can include a plurality of mobile devices and more than one server/base station, however, only one of each are illustrated for purposes of simplicity. In accordance with some aspects, a server supplying the media stream can be included in or combined with a base station (e.g., communications apparatus 104). However, in accordance with some aspects, base stations controllers communicate (e.g., over the Internet) with servers owned by or leased by the multimedia providers in order to obtain the media stream. Thus, any aspects or examples with respect to base stations, servers, and other entities that provide media stream for delivery to mobile devices are intended to cover such variants.

Included in communications apparatus 104 is a receiver 110 that is configured to receive a request from mobile device 108 for broadcast multimedia 106, such as an Internet radio broadcast. Based on this request, a data rate module 112 is configured to transmit the broadcast multimedia 106 as packets to mobile device 108 at a first data rate, initially, and can deliver the broadcast multimedia 106 at the first data rate utilizing unicast mode. The first data rate can be a high data rate, which is much higher than a real-time data rate. Delivering the broadcast multimedia 106 initially (or after a buffer length drops below a threshold length) at the high data rate is of benefit to a user because the user can consume the multimedia sooner. Further, delivering the broadcast multimedia 106 at the high rate is not more expensive for the network resources over time because the number of good packets delivered by the communications network 102 is the same, regardless of whether the packets are transmitted at a high data rate, a real-time data rate (e.g., an average of a real-time data rate), or other rates.

At least a subset of the broadcast multimedia 106 is transmitted, by a transmitter 114, at this first data rate until a signal is received (at receiver 110) from mobile device 108 that indicates a buffer 116 associated with mobile device 108 has reached a first threshold length, which will be discussed in further detail below.

An adjustment module 118 is configured to interpret the first threshold length signal and cause data rate module 112 to change the data rate from the first data rate to a second data rate at which further packets of the broadcast multimedia 106 are transmitted. Thus, the broadcast multimedia 106, which was delivered, for example, at high data rates initially can be delivered at real-time rates or at a different rate (e.g., an intermediate rate between the high data rate and the real-time rate) after the first threshold length signal is received from mobile device 108. In accordance with some aspects, the real-time rate can be determined in an average manner. For example, the rate can be higher than, lower than, or at a real-time rate, provided the average of the rate over time is a real-time rate. For example, the rate can go higher and lower in alternation or the packets can be sent or not sent, in alternation, provided the average is approximately a real-time rate.

According to various aspects, the packets can be sent at the second data rate until a second buffer threshold length is reached, as determined by a signal received from mobile device 108. At about the same time as receiving the second threshold length signal, adjustment module 118 can change the data rate from the second data rate to a third data rate. For example, the second data rate can be a data rate between the high data rate and the real-time rate and the third data rate can be an average real-time data rate. Multiple buffer threshold lengths can be utilized to mitigate an instantaneous load on the forward link, for example. Forward link is the radio link from communications apparatus 104 to mobile device 108. Reverse link is the link from mobile device 108 to communications apparatus 104. Forward link carriers/sends outbound packets of information of internet radio content or broadcast multimedia content to mobile device 108.

In accordance with some aspects, the broadcast multimedia 106 is transmitted to mobile device 108 at real-time rates (e.g., second data rate, third data rate, or a subsequent data rate) in unicast mode. However, in accordance with other aspects, the broadcast multimedia 106 is transmitted to mobile device 108 at real-time rates in multicast mode. The mode utilized can be selected as a function of mobile device 108 configuration and/or system 100 configuration. Further, there can be a transition from unicast mode to multicast mode or from multicast mode to unicast mode based on buffer length and/or other parameters.

At times, mobile device 108 might deplete its buffer 116 and, therefore, the buffer length might fall below the first threshold length or the second (or subsequent) threshold length. If mobile device 108 has depleted a sufficient portion of buffer 116, it might be beneficial for mobile device 108 to increase the buffer length (up to (or more than) the first or second buffer threshold length). In this case, communications apparatus 104 receives a message, at receiver 110, that requests subsequent packets of broadcast multimedia 106 to be transmitted at first data rate in order for mobile device 108 to replenish buffer 116. In this situation, data rate module 112 (or transmitter 114) can begin to transmit the subsequent packets of broadcast multimedia 106 at first data rate until mobile device 108 indicates that the buffer threshold length is adequate (e.g., has reached first buffer threshold length, second buffer threshold length, and so on). At substantially the same time as receiving an indication that the first (or second) buffer threshold length is met (or exceeded), adjustment module 118, instructs data rate module 112 to continue to transmit the subsequent packets of broadcast multimedia 106 at second (or third) data rate. Thus, data rate module 112 is configured to transmit the broadcast multimedia 106 at variable rates as a function of mobile device 108 buffer length and/or other considerations.

In accordance with some aspects, multicast mode can be utilized to transmit broadcast multimedia 106 to mobile device 108 (as well as other devices) within the area. In this situation, an evaluation module 120 is configured to determine whether there is (or can be) a multicast group in the area. Further, evaluation module 120 can determine whether mobile device 108 should be included in that multicast group or whether mobile device 108 cannot join the multicast group. In accordance with some aspects, the determination whether mobile device 108 can join the multicast group can be a function of network parameters (e.g., whether there is at least one other user consuming the same content). According to some aspects, the determination whether mobile device 108 can join the multicast group can be of function of device parameters. For the determination, evaluation module 120 can ascertain whether mobile device 108 is a disadvantaged user and, if included in the multicast group, whether mobile device 108 will be the most disadvantaged user. For example, evaluation module 120 can review parameters, such as QAM (Quadrature Amplitude Modulation) alphabet level and coding rate and the recent rate at which mobile device 108 has been sending NACKs (Negative Acknowledgements). If mobile device 108 is the most disadvantaged user and is allowed to join the multicast group, then the level of NACKs in the multicast group will increase, which will be a disadvantage to other devices in the multicast group, which is not desirable. If mobile device 108 will not be the most disadvantaged user and is to join multicast group and/or is to be paired with at least one other device to form a multicast group, instruction module 122 sends an instruction to mobile device 108 in order for mobile device 108 to join the multicast group.

System 100 can include memory 124 operatively coupled to communications apparatus 104. Memory 124 can be external to communications apparatus 104 or can reside within communications apparatus 104. Memory 124 can retain instructions related to sending multimedia to a mobile device at a first data rate if a buffer length of mobile device is below a first threshold length. Memory 124 retains further instructions related to changing the first data rate to at least a second data rate based on a first indication that the buffer length is at or above the first threshold length. The first data rate is sent in a unicast mode.

In accordance with some aspects, the multimedia is sent at the second data rate in unicast mode or in multicast mode. Memory 124 retains further instructions related to selecting the unicast mode or a multicast mode as a function of device parameters or network parameters. According to some aspects, the multimedia is sent at the second data rate in the multicast mode and memory 124 retains further instructions related to receiving a second indication that the buffer length of the mobile device has dropped below first threshold length. Memory 124 also retains instructions related to sending a plurality of additional packets of the multimedia to mobile device 108 at the first data rate in the unicast mode.

According to some aspects, the multimedia is sent at the second data rate in a multicast mode. Memory 124 retains instructions related to receiving a second indication that buffer length of the mobile device has dropped below first threshold length and sending a plurality of additional packets of the multimedia to mobile device at first data rate in unicast mode.

Alternatively or additionally, memory 124 can retain instructions related to determining whether mobile device 108 can join a multicast group and sending an instruction to mobile device 108 for mobile device 108 to join the multicast group. A plurality of additional packets are sent at second data rate to the multicast group in the multicast mode.

Further, memory 124 can retain instructions related to transmitting multimedia at variable rates as a function of a mobile device's buffer length, wherein at least one rate is a high data rate. Memory 124 can also store information related to conveying multimedia in unicast mode at a first data rate, switching to a second data rate when a first buffer threshold length is reached, wherein unicast mode or multicast mode can be utilized to transmit the multimedia at the second data rate. Additionally, memory 124 can store information related to changing from a unicast mode to a multicast mode and from a multicast mode to a unicast mode as a function of buffer length or other parameters. Memory 124 can further store other suitable information related to signals transmitted and received in a communication network.

At least one processor 126 is operatively coupled to memory 124 (or communications apparatus 104) and is configured to execute the instructions retained in memory 124 to facilitate analysis of information related to conveying multimedia at variable rates as a function of a buffer length created by mobile device 108. Processor 126 can be a processor dedicated to analyzing and/or generating information received by communications apparatus 104, a processor that controls one or more components of system 100, and/or a processor that both analyzes and generates information received by communications apparatus 104 and controls one or more components of system 100.

According to some aspects, processor 126 is configured to transmit broadcast multimedia at variable rates as a function of network parameters or device parameters. Processor 126 includes a first module for sending the broadcast multimedia to the device at high data rates if a buffer length of the device is below a threshold length and a second module for switching the data rate to a real-time data rate if the buffer length of the device is at or above the threshold length. Processor 126 also includes a third module for selectively allowing the device to join a multicast group. The broadcast multimedia is sent at high data rates in unicast mode and at real-time data rates in multicast mode if device can join multicast group. The broadcast multimedia is sent at real-time data rates in unicast mode if device cannot join multicast group.

Memory 124 can store protocols associated with transmitting multimedia using Internet capability of a network, taking action to control communication between communications apparatus 104 and mobile device 108, such that system 100 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 2:
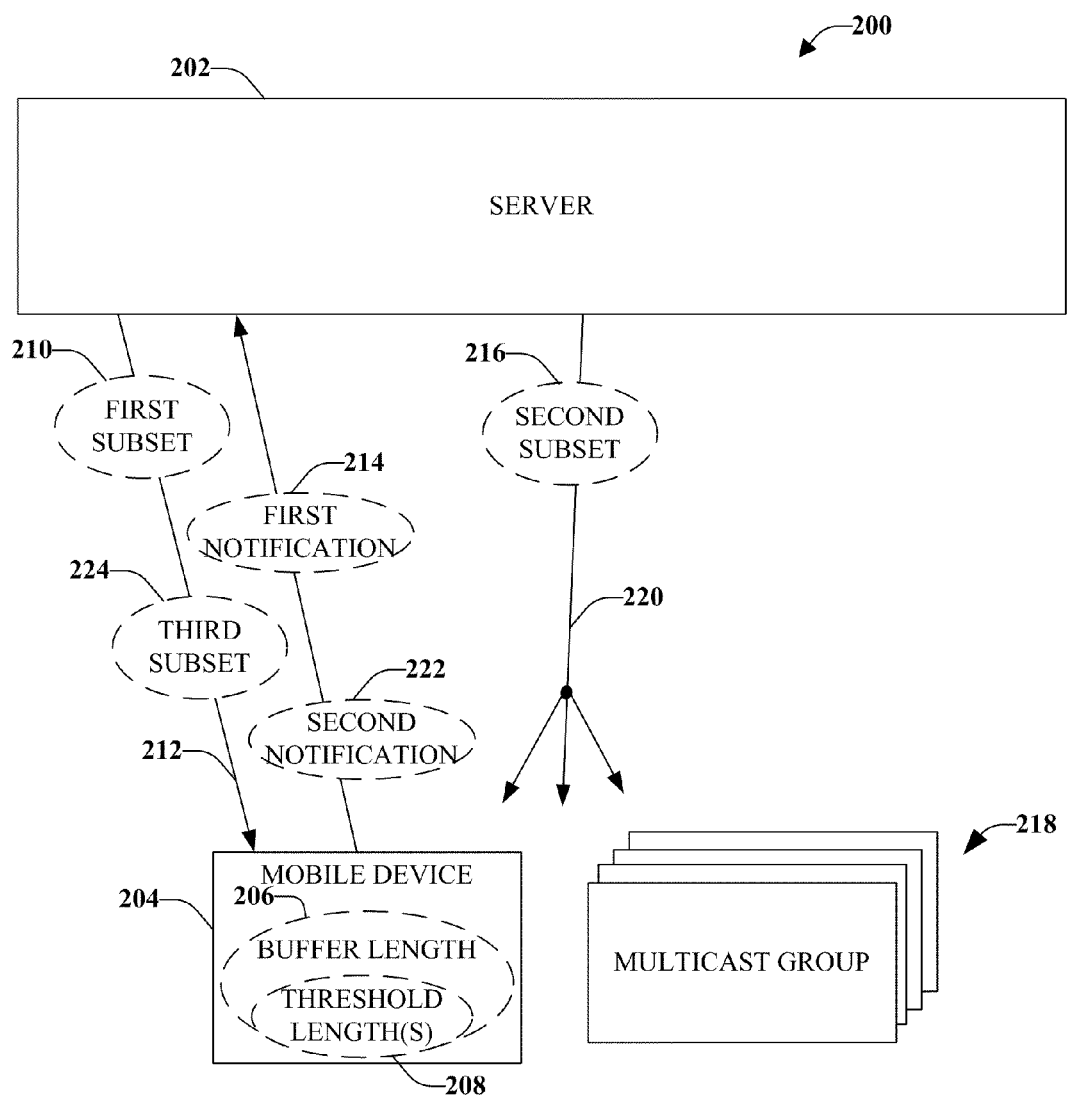
FIG. 2 illustrates a schematic representation of a communications environment in which the disclosed aspects can be utilized.

FIG. 2 illustrates a schematic representation of a communications environment 200 in which the disclosed aspects can be utilized. Included in communications environment 200 is a server 202 or a plurality of servers (or another device that is configured to supply broadcast multimedia content). Also included in communications environment 200 is a mobile device 204 that can retain data in a buffer that can have a buffer length 206 that is of a long duration (e.g., one minute). Further a buffer threshold lengths 208 can be specified as a function of device capabilities, device parameters, network parameters (including network conditions), and so on. When a request is received by server 202 (base station or another entity as discussed above) from mobile device 204 for transmission of packets of broadcast multimedia, server 202 transmits a first subset of packets 210 over a link. The first subset of packets 210 is sent in a unicast mode 212 and are sent at a first data rate. Mobile device 204 monitors buffer length 206 and when the buffer length 206 reaches or exceeds a first buffer threshold length 208, a first notification 214 is transmitted from mobile device 204 to server 202.

At substantially the same time as receiving first notification 214, server 202, begins to send to mobile device 204 a second subset of packets 216 at a second data rate. The second subset of packets can be transmitted in unicast mode 212. However, in accordance with some aspects, mobile device 204 might join multicast group 218 at about the same time as buffer length 206 meets or exceeds first buffer threshold length 208, wherein multicast group 218 includes at least two mobile devices. If mobile device 204 is a member of multicast group 218, second subset of packets 216 is transmitted in multicast mode 220, as illustrated. Second subset of packets 216 are transmitted at a second data rate.

While receiving the second subset of packets 216 at the second data rate, server 202 and/or mobile device 204 monitor buffer length 206 and, if buffer length 206 drops below the first buffer threshold length 208, a second notification 222 is transmitted to server 202. In accordance with some aspects, server 202 can autonomously determine that buffer length of mobile device 204 is below the first threshold length (e.g., based on the number of NACKs received, base on not receiving a response, and so forth). In these aspects, mobile device 204 does not need to transmit second notification 222.

As a function of second notification 222 and/or an autonomous determination by server 202, a third subset of packets 224 is transmitted, in unicast mode 212 at first data rate so that the buffer length 206 is quickly brought up to the first buffer threshold length 208. After receiving enough packets at the first data rate, mobile device 204 can rejoin multicast group 218 or another multicast group 218 or can remain in unicast mode 212. The first data rate can be a high data rate and the second data rate can be a real-time data rate.

In accordance with some aspects, the first data rate is a high data rate and the second data rate is an intermediate data rate (e.g., lower than high data rate and higher than real-time data rate). In this aspect, a second buffer threshold length is determined and, upon reaching or exceeding second buffer threshold length, a notification (e.g., third notification) is sent to server 202. At about the same time as receiving third notification, the data rate is changed from second data rate to a third data rate, which can be a real-time data rate. In this aspect, the second data rate is sent in unicast mode and the third data rate is sent in unicast mode or multicast mode, depending on whether mobile device 204 is included in multicast group 218. Additional data rates and buffer threshold lengths can also be utilized depending on the implementation and the desired variability of data rates and buffer thresholds.

Figure 3:
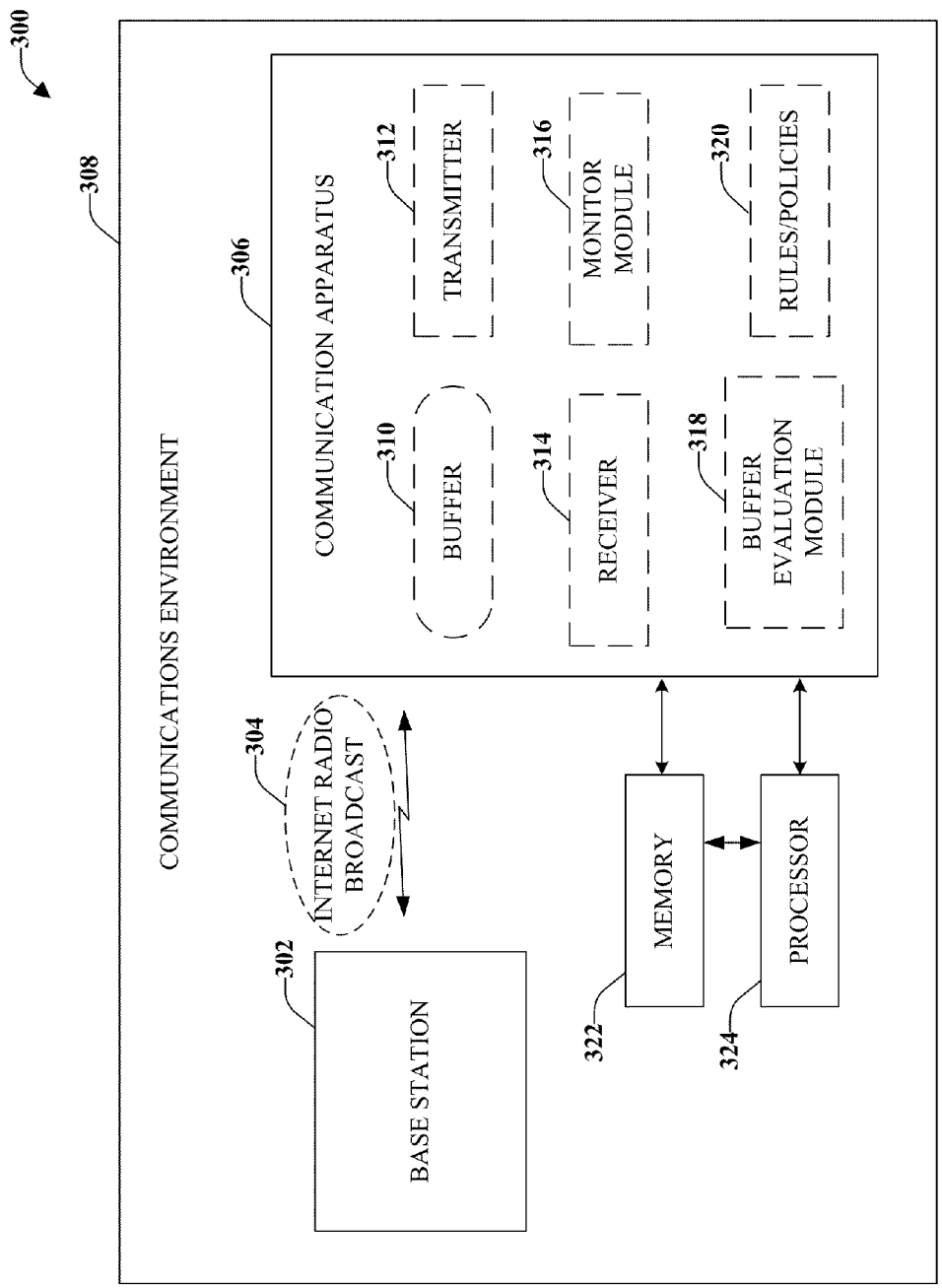
FIG. 3 illustrates a system for receiving Internet radio broadcast using cellular, according to an aspect.

FIG. 3 illustrates a system 300 for receiving Internet radio broadcast using cellular, according to an aspect. System 300 includes a base station 302 that is configured to convey broadcast multimedia, such as an Internet radio broadcast 304, to a communications apparatus 306, which can be a mobile device. Base station 302 and communications apparatus 306 can be included in a communications environment 308. Although a number of base stations and mobile devices can be included in communications environment 308, as will be appreciated, a single base station 302 that transmits communication data signals to a single mobile device (e.g., communications apparatus 306) is illustrated for purposes of simplicity.

Communications apparatus 306 is equipped with both unicast functionality and multicast functionality. Communications apparatus 306 includes a buffer 310 that should be formed before communications apparatus 306 allows a user of communications apparatus 306 to start to consume multimedia due to the erratic delays that can be experienced because of connectivity issues (e.g., due to Internet network, satellite broadcasts, and so forth) that might develop. In accordance with various aspects presented herein, buffer 310 should be of a longer length than a length typically utilized. For example, conventional systems provide for a buffer length of five or ten seconds of playing time. However, the disclosed aspects are configured to extend that length further and are able to achieve this extended length in a short amount of time based on transmission of multimedia (e.g., Internet radio broadcast 304) at initially high data rates. These high data rates can be achieved without additional costs to system 300 over time.

Communications apparatus 306 also includes a transmitter 312 that is configured to notify base station 302 (or another node that is configured to deliver content to communications apparatus 306) when a user of communications apparatus 306 would like multimedia content delivered for consumption by the user. Based on this request, base station 302 can begin to send the requested multimedia to apparatus at a first data rate, which is received at a receiver 314. The multimedia can be transmitted at the first data rate in unicast mode.

A monitor module 316 is configured to monitor a length of buffer 310 to determine whether enough data has been received to fill the buffer to an appropriate length. For example, a first threshold length can be established whereby below that threshold length, more data (or packets) should be transmitted at first data rate. If the length of the buffer 310 is at or above first threshold length, the length is sufficient and the multimedia no longer needs to be transmitted at the first data rate. If the buffer length is at or above first threshold length, a message is transmitted to base station 302 (e.g., by transmitter 312) notifying base station 302 that the buffer length for communications apparatus 306 is at first threshold length. Based on this notification, base station 302 can switch from first data rate to a second data rate in order to transmit the multimedia to communications apparatus 306. The multimedia can be transmitted at second data rate in unicast mode or in multicast mode, wherein the mode is selected as a function of communication apparatus 306 parameters, system 300 parameters, as well as other considerations. The first data rate can be a high data rate and the second data rate can be a real-time data rate.

According to various aspects, the first data rate can be a high data rate and the second data rate can be an intermediate data rate, wherein the broadcast is transmitted in unicast mode at the first data rate and the second data rate. A second (or more) buffer threshold rate can be established, wherein when buffer length is at the second (or more) buffer threshold rate, a notification is sent to base station 302. At about the same time as receiving the notification, base station 302 adjusts the transmission from second data rate to a third (or more) data rate. Third data rate can be a real-time rate and can be transmitted in unicast mode or multicast mode based on whether communication apparatus 306 is included in a multicast group.

In accordance with some aspects, communications apparatus 306 might lose a signal from base station 302 and, therefore, can start to consume the multimedia retained in buffer 310. The connectivity with base station 302 might be reestablished before the buffer is depleted significantly (e.g., below first threshold length, below second threshold length, and so forth). However, there might be situations where connectivity is lost for a longer period of time and buffer 310 might be significantly depleted (e.g., 10% below threshold length, 25% below threshold length, 55% below threshold length, and so on). A buffer evaluation module 318 can selectively observe the buffer length continuously, periodically, or based on other time intervals. As a function of the percentage (or other measurement) of the reduction in the amount of buffer length, buffer evaluation module 318 can cause a signal to be transmitted to base station (by transmitter 312) that indicates the buffer length is inadequate. Based on this signal, base station 302 can switch to transmitting the multimedia to communications apparatus 306 at a first data rate (second data rate, or a different data rate as a function of the buffer length determination (e.g., if buffer length is between first buffer threshold length and second buffer threshold length, a second data rate is utilized), until a first indication is received by communications apparatus 306 that the buffer length is sufficient. Thus, to increase buffer length, the multimedia can be transmitted in unicast mode at first data rate, for example. After the buffer length is sufficient, the multimedia can be transmitted in either unicast mode or multicast mode. If there is a decrease in buffer length, additional multimedia packets can be transmitted at the high data rate in unicast mode.

For example, if communications apparatus 306 is out of service and cannot close a link to base station 302, buffer 310 will be depleted. When service is reestablished with base station 302 and buffer 310 has not been completely depleted (and communications apparatus 306 was receiving the multimedia in unicast mode), communications apparatus 306 signals the last packet received successfully and base station 302 begins to transmit at higher than real-time rates until buffer 310 is rebuilt.

If communications apparatus 306 was part of a multicast group when service was lost (e.g., multimedia was received in multicast mode), communications apparatus 306 should separate from the multicast group when service is lost to mitigate adverse consequences to the other users in the multicast group. Therefore, rules/policies 320 can be established whereby communications apparatus 306 no longer considers itself part of the multicast group based on losing connectively with base station 302. Communications apparatus 306 will then attempt to automatically reestablish a unicast mode connection with base station 302 before attempting to rejoin the multicast group. The rules/policies 320 can provide that when communications apparatus 306 has issued a maximum number of negative acknowledgements (NACKs) for the last n packets (where n is an integer), then communications apparatus 306 should disassociate from the multicast group. Other rules/policies 320 can include that if a CRC (Cyclic Redundancy Check) has failed on the last m packets (where m is an integer), then apparatus should disassociate from the multicast group. Additional rules/policies 320 can be established that indicate when communications apparatus 306 should disassociate from a multicast group.

In accordance with some aspects, two different networks can be utilized. For example, in sectors that cover most of a metro area, there can be relatively few cars receiving broadcasts (e.g., tens to low hundreds of cars). However, there will be sectors where there can be thousands of cars all receiving these broadcasts, such as on freeways or other major traffic arteries. For example, in these areas, there can be many parallel lanes in each direction and the cars could be bumper to bumper in rush hour traffic. In fact, there can be so many cars (and associated mobile devices) that a service provider might want to make the sectors smaller than usual (and that propagation would allow) in order to handle the device traffic.

These conditions along freeways and other areas suggest the use of a less expensive spectrum. For example, these spectrums can be Media Distribution System (MDS) in the United States. Other inexpensive spectrum could be higher frequency bands that are undesirable in general use because of propagation reasons. However, on freeways and open boulevards, the propagation would be adequate, especially when the sectors are oriented along the freeway and are not intended to have much communication range.

These spectrums can be utilized to build an essentially autonomous network that covers the area of major device traffic (traffic in the sense of many users of the radio broadcasts). This network provides coverage in the heaviest used areas. When a mobile device leaves this type of area, mobile device can fall back to being served by the normal IP cellular network. Handoff from one network to another network can be simple and performed at the IP layer.

In an example, for cell to cell or sector to sector handoff, the packets can be received from a first cell (e.g., base station 302) at a second rate, such as at approximately a real-time data rate (e.g., average real-time data rate). Communication apparatus 306 discontinues a connection to the first cell and waits to establish a connection to a second cell. The connection with the second cell is in unicast mode, regardless of the mode utilized for connection with the first cell. During the time between discontinuing the connection with the first cell and establishing the connection with second cell, buffer 310 might be depleted such that the loss of packets is significant, and therefore, further packets might be sent by second cell at higher than real-time data rates. If (or when) buffer 310 is at a sufficient level and if there is a multicast group, communication apparatus 306 can be switched to multicast mode, as previously discussed.

In accordance with some aspects, communications apparatus 306 can output (e.g., visual, audio, and so on) to the user (of communications apparatus 306) information related to buffer fill status, lack of connection to outbound forward link, and so forth. This information can be utilized to inform the user that the connection will be lost, that the connection is unavailable, and so forth. According to an aspect, based on the information, the user can determine that the connection has been unavailable for an extended period of time and that regaining the connection is necessary to maintain the service. The user might assist by moving to a location where service can be reestablished. In accordance with some aspects, a prompt can be rendered (e.g., visual, audio, and so on) to the user indicating that that the buffer level is being depleted and that the user should attempt to establish a better communication link in order to avoid termination and/or interruption of the service.

System 300 can include memory 322 operatively coupled to communications apparatus 306. Memory 322 can be external to communications apparatus 306 or can reside within communications apparatus 306. Memory 322 can store information related to requesting a broadcast multimedia, wherein the broadcast multimedia comprises a plurality of packets. Memory 322 can also retain further instruction related to receiving a subset of the plurality of packets at a first data rate and monitoring a buffer length. Memory 322 retains further instructions related to sending a notification when the buffer length is at or above a first threshold length and receiving a second subset of the plurality of packets at a second rate.

According to some aspects, the subset of the plurality of packets received at the first data rate are received in unicast mode. The second subset of the plurality of packets received at the second data rate are received in unicast mode or in multicast mode as a function of parameters of communication apparatus 306 or parameters of communications environment 308.

In accordance with some aspects, first data rate is a high data rate and second data rate is an intermediate data rate. Memory 322 retains further instructions related to monitoring the buffer length as the second subset of the plurality of packets are received. Further, memory 322 retains instructions related to transmitting a second notification when buffer length is at or above a second threshold length and receiving a third set of packets at a third data rate.

According to some aspects, first data rate is a high data rate and the first subset of the plurality of packets are received in unicast mode and second data rate is a real-time data rate and the second subset of the plurality of packets are received in multicast mode. Memory 322 retains further instructions related to performing handoff and determining buffer length is below the first threshold length. Memory 322 also retains instructions related to receiving a third set of packets at the first data rate in unicast mode and sending a second notification when buffer length is at or above first threshold length. Further, memory 322 retains instructions related to joining a multicast group as a function of a received instruction to join multicast group and receiving a fourth set of packets in multicast mode at second data rate.

In accordance with some aspects, the second subset of the plurality of packets are receiving in multicast mode. Memory 322 retains further instructions related to monitoring the buffer length as the second subset of packets are received at the second rate. Further, memory retains instructions related to switching from the multicast mode to the unicast mode and receiving a third subset of packets in the unicast mode at the first data rate until the buffer length is at or above the first threshold length.

According to some aspects, the second subset of the plurality of packets are received in multicast mode. Memory 322 retains further instructions related to determining communications apparatus 306 is a most disadvantaged user in a multicast group. Further, memory 322 retains instructions related to disassociating from the multicast group and receiving a third subset of the plurality of packets at a first data rate in the unicast mode. To determine communications apparatus 306 is the most disadvantaged user in the multicast group, according to some aspects, memory 322 retains further instructions related to determining a maximum number of negative acknowledgements have been issued for n packets. According to some aspects, to determine communications apparatus 306 is the most disadvantaged user in the multicast group, memory 322 retains instructions related to determining that for m packets a CRC has failed.

Memory 322 can also store information related to selectively disassociating from a multicast group if at least a portion of the buffer has been depleted or based on other factors (e.g., poor connectivity) and rejoining the multicast group at a more appropriate time (e.g., when buffer length is at or above the first threshold length, when connectivity conditions have improved, and so forth). Memory 322 can also store other suitable information related to signals transmitted and received in a communication network.

At least one processor 324 is operatively coupled to memory 322 (or communications apparatus 306) and is configured to execute the instructions retained in memory 322. Processor 324 can facilitate analysis of information related to receiving multimedia in a communication network. Processor 324 can be a processor dedicated to analyzing and/or generating information received by communications apparatus 306, a processor that controls one or more components of system 300, and/or a processor that both analyzes and generates information received by communications apparatus 306 and controls one or more components of system 300.

According to some aspects, processor 324 is configured to receive Internet radio broadcast over a cellular link. Processor 324 includes a first module for receiving a first subset of packets for the Internet radio broadcast over a unicast transmission at a data rate that is higher than a real-time rate and a second module for notifying the server when a buffer length is at or above a threshold length. Further, processor 324 includes a third module for receiving a second subset of packets for the Internet radio broadcast at a real-time data rate, wherein the second subset of packets are sent over a unicast mode or a multicast mode. In accordance with some aspects, processor 324 also includes a fourth module for receiving a third subset of packets for the Internet radio broadcast at higher than the real-time rate in unicast mode if the buffer length drops below the threshold length. According to some aspects, the second subset of packets can be received over the multicast mode and processor 324 further comprises a fourth module for disassociating from a multicast group and a fifth module for receiving a third subset of packets in a unicast mode.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
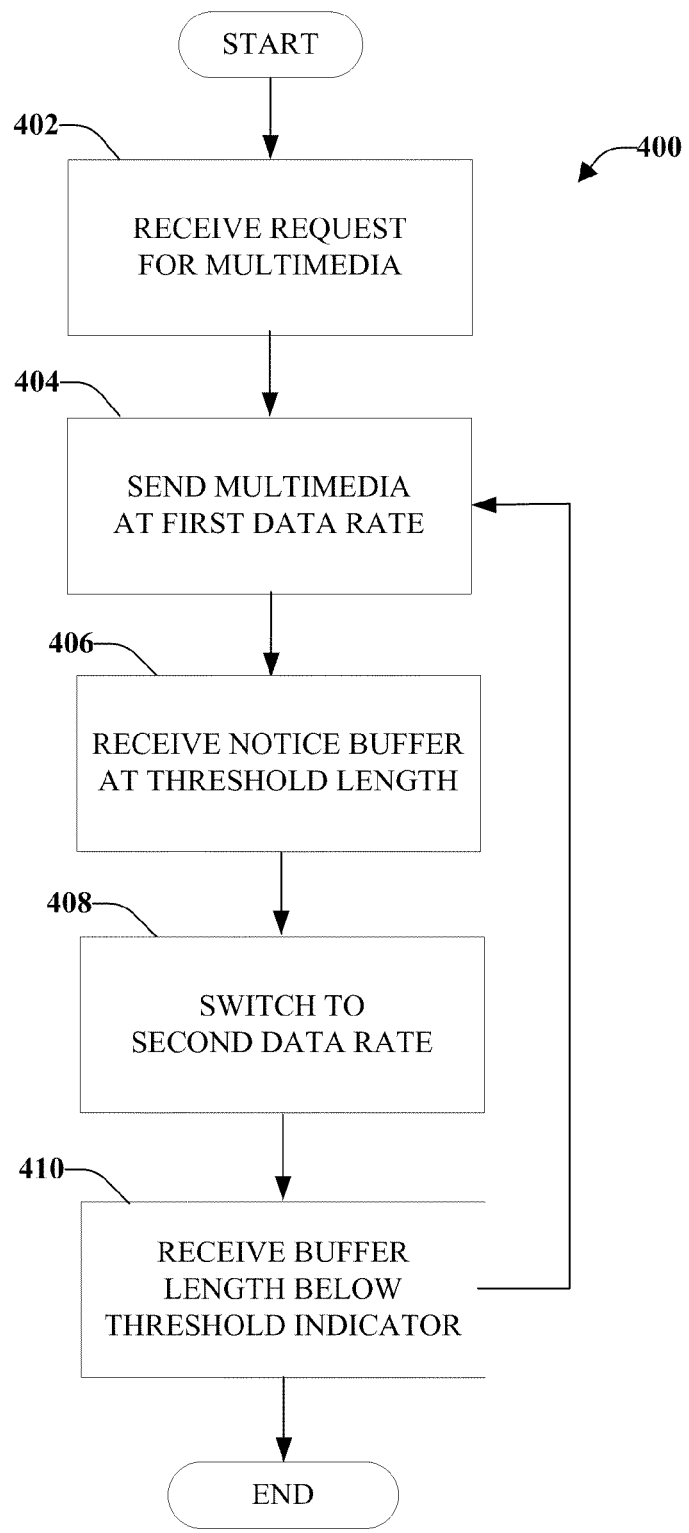
FIG. 4 illustrates a method for delivering broadcast multimedia though a unicast connection in accordance with an aspect.

FIG. 4 illustrates a method 400 for delivering broadcast multimedia though a unicast connection in accordance with an aspect. For non-radio Internet broadcasting, for example, a receiver device (e.g., mobile device) forms a buffer before mobile device starts to play out because of the vagaries of delays on the Internet land network. This buffer can be relatively short (e.g., five to ten seconds of playing time). However, in addition, mobile device might be moved into places where radio transmission is very bad and where there can be a dropout lasting many seconds. For at least this reason, a longer buffer length is desirable (e.g., one minute of playing time). However, if the media stream is delivered to mobile device at real-time rates and the device delayed playing until a one-minute buffer was formed, the delay (from the user's point of view) would be untenable. To satisfy these conflicting demands, the transmission from base station to mobile device starts out at higher, and in many cases much higher, than real-time rates. In this manner, at the end of a few seconds, a considerable buffer can be built up. That buffer can be less than the target buffer rate, but enough to get started. The delivery can continue to be at faster than real time rates until the desired buffer size is reached. After that, delivery proceeds at real-time rates. It should be noted that if mobile device is in an area of very poor service where mobile device is unable to close the link; mobile device will start to deplete the buffer. If mobile device is moved into an area where transmission can resume, the transmission to mobile device will resume at higher than real-time rates until the desired buffer is reached.

Method 400 starts, at 402, when a signal is received from a mobile device. The signal indicates that mobile device (e.g., mobile device user) desires to receive a broadcast multimedia. At 404, a first set of the broadcast multimedia packets is transmitted utilizing a unicast stream at a first data rate, which can be a high data rate. The first set of broadcast multimedia packets is transmitted utilizing the first data rate until a notice is received from mobile device, at 406, with an indication that a buffer of mobile device is at a first threshold length. At substantially the same time as receiving the notification, the transfer rate of the multimedia is reduced from the first data rate to a second data rate, at 408 and a second set of broadcast multimedia packets is sent. The second set of broadcast multimedia packets is transferred at this second rate until all packets associated with the multimedia are transmitted and/or until a first notification is received, at 410, from mobile device. The notification is received if a buffer length of mobile device falls below the threshold length (or has dropped below a percentage of the threshold length (e.g., 20% below the threshold, 30% below the threshold, and so on)). As a function of the notification received, at 410, method 400 continues, at 404, and a third set of broadcast multimedia packets is transmitted at a high data rate until a second notification is received, at 406, indicating that the threshold length is reached. Method 400 continues in this manner until all packets associated with the multimedia are transmitted to mobile device and/or a connection with mobile device is lost.

In accordance with some aspects, second rate is a real-time data rate. However, in accordance with other aspects, second rate is an intermediate data rate (e.g., a rate between a high data rate and a real-time data rate). In these aspects, method 400 can be configured to transmit at second data rate until buffer length reaches a second threshold length. When buffer is at or above the second threshold length, the transmission can be at a third data rate, which can be a real-time rate. The media streams set at third data rate can be sent in unicast mode or multicast mode.

Figure 5:
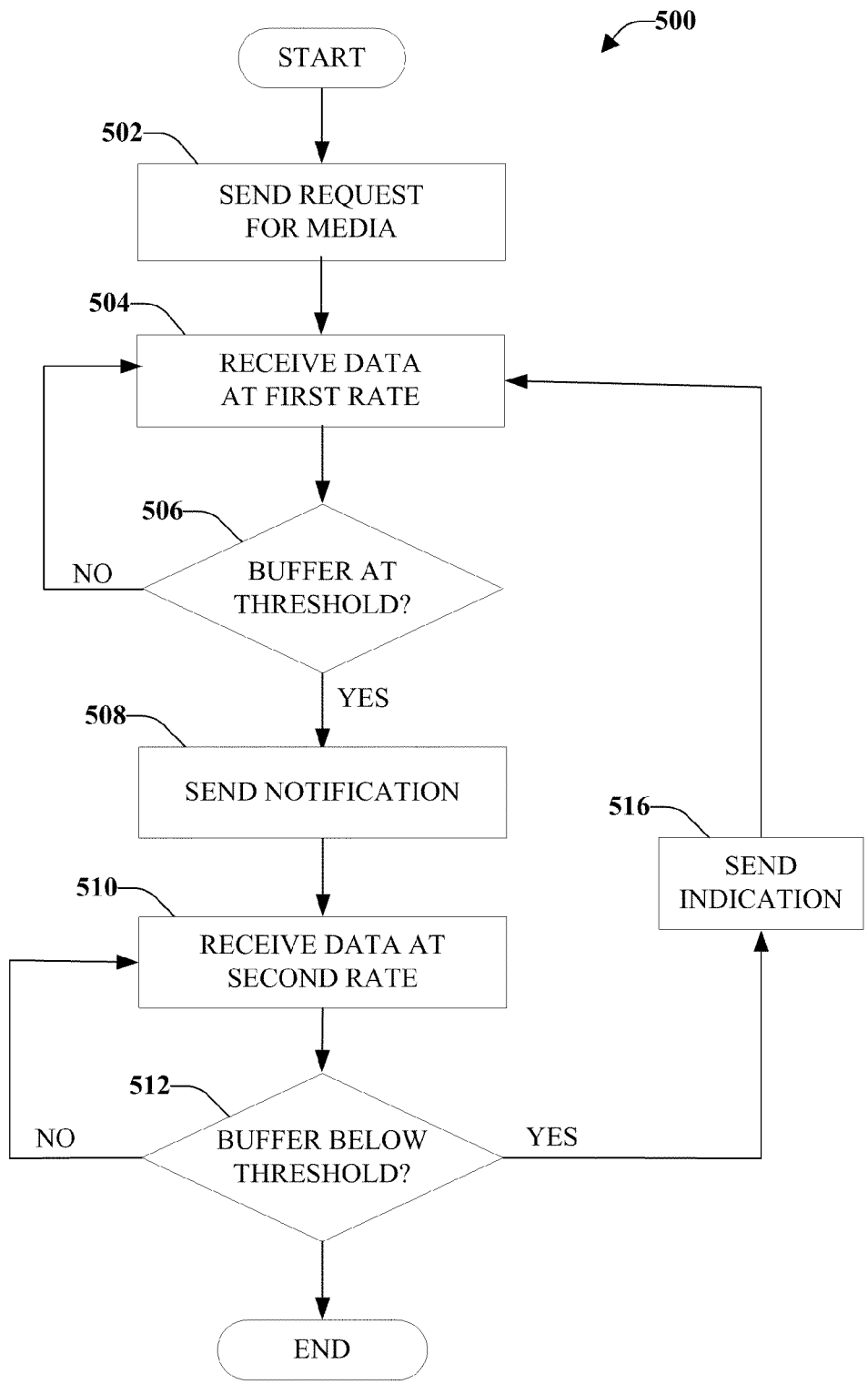
FIG. 5 illustrates a method for receiving broadcast multimedia though a unicast connection utilizing a flexible buffer, according to an aspect.

FIG. 5 illustrates a method 500 for receiving broadcast multimedia though a unicast connection utilizing a flexible buffer, according to an aspect. Method 500 is configured to receive multimedia at a first data rate until a buffer, associated with a mobile device, is at a first threshold length. Upon reaching the first threshold length, the multimedia is received at a second rate until there is a change in the buffer length and/or until all packets associated with the multimedia are received.

In further detail, at 502, a request for multimedia is sent, which can be a request from a user to obtain the multimedia. In reply to the request, at 504, the multimedia is received, in unicast mode, at a first data rate. As the multimedia is received at first data rate, the buffer is monitored and a determination is made, at 506, whether the buffer length is at (or above) first buffer threshold length or not at (or above) first buffer threshold length. If not at (or above) first buffer threshold length ("NO"), method 500 continues, at 504, and the multimedia is continued to be received at first data rate. If the determination, at 508, is that the first buffer threshold length has been reached ("YES"), at 508, a message is transmitted to base station. The message includes a first notification that the amount of multimedia in the buffer is at or above the first threshold length. As a function of the notification, further packets of the multimedia are received, at 510, at second data rate. The multimedia can be received at second data rate until all packets associated with the multimedia are received. In accordance with some aspects, a second (or more) threshold lengths are utilized in order to mitigate an instantaneous load on the forward link, which is a radio link that carries various traffic formulations (e.g., multicast, unicast, broadcast multimedia, and so forth). Thus, a third (or more) data rate can be utilized to convey the media streams.

While the multimedia is being received, there is continuing monitoring of the buffer length, at 512, in order to determine whether the buffer length has dropped below the respective (e.g., first, second, etc.) buffer threshold length. If the buffer length has not dropped below the respective threshold length ("NO"), method 500 continues, at 510, and the multimedia is received at second (or third, etc.) rates. If the buffer length has dropped below the respective buffer threshold length or below a percentage of the respective threshold length ("YES"), a second notification is transmitted, at 516, to indicate that the multimedia should be transmitted at first (or second) data rate in order for the buffer length to be brought back up to the respective buffer threshold length. The data is received at first (or second, etc.) data rate, at 504, until the buffer length is at or above the respective buffer threshold length. Method 500 continues in this manner until all packets associated with the multimedia are received and/or until connectivity is lost.

Figure 6:
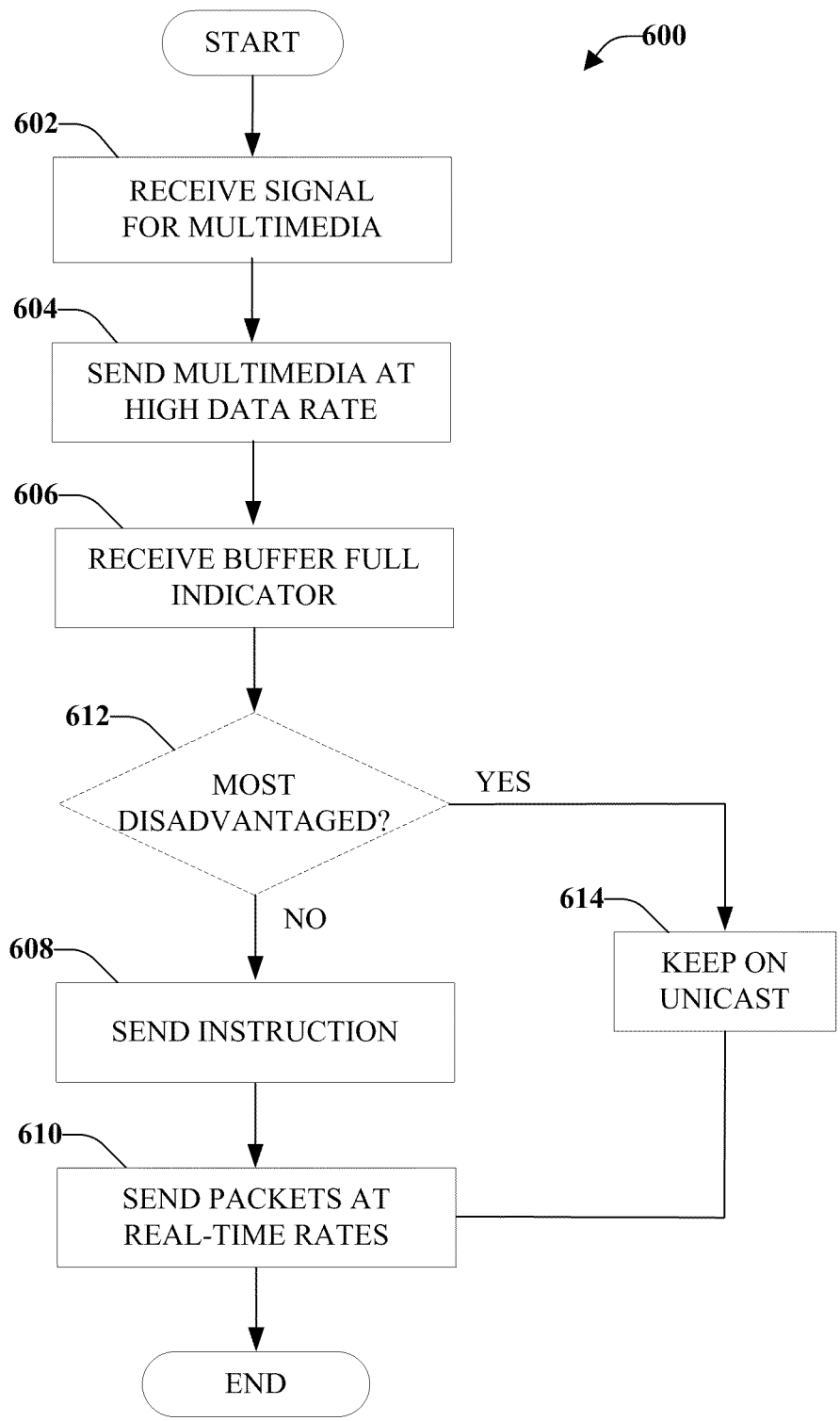
FIG. 6 illustrates a method for providing multimedia though a multicast transmission, according to an aspect.

FIG. 6 illustrates a method 600 for providing multimedia though a multicast transmission, according to an aspect. Method 600 can be performed by a node that is configured to deliver content, such as a base station or server(s). Method 600 is configured to allow a mobile device to join a multicast group. Assume there is a multicast operation occurring in a sector for N mobile devices (where N is an integer) and an N+1 mobile device signals (e.g., through an IP address sent by mobile device) that mobile device wants to obtain multimedia and join that group.

There might be broadcasts that several users in a given sector will want to consume (e.g., listen to). Network efficiency can be improved by multicast transmission to that group of users. In this multicasting, the most disadvantaged user will set the conditions for the transmission (e.g., the QAM constellation used, the rate of the FEC (Forward Error Correction)). In general, this can result in a certain number of packet repeats. It is assumed, for purposes of discussion, that the basic mechanism of adjustment on the forward link is incremental redundancy (packet retransmission) based on use of the fast NACK from a mobile device. Therefore, if the most disadvantaged user sends too many NACKs, the base station will adjust by reordering the transmission parameters so that fewer bits per symbol are used and/or a lower coding rate is used, or both. Meanwhile, the other users are able to continue receiving the broadcast using no additional network resources. It should also be noted that as conditions become better (almost eliminating NACKs and/or signaling from users that their measured SNR (Signal to Noise Ratio) is higher than needed) the adjustment can be made in the other direction.

A signal from mobile device is received, at 602. The signal indicates that mobile device desires to receive certain multimedia content. Initially, packets of that multimedia content are sent in unicast mode, at 604, at a first data rate, which can be a high data rate. When a buffer of the mobile device reaches a desired length (e.g., a first buffer threshold length), a signal is received, at 606. In accordance with some aspects, there are multiple buffer threshold lengths, wherein a transition between a fast data rate and a real-time data rate is performed incrementally through utilization of multiple data rates.

If unicast mode were to persist, the signal would be an indication to start transmitting at a second data rate, which can be real-time rates, or an average real-time data rate, rather than the first data rate, which is faster than real-time rates. However, in this case, unicast mode will not persist, but instead, multicast mode will be utilized. Thus, at 608, a message is sent instructing mobile device to join the multicast group and to start receiving a multicast stream. The unicast stream is discontinued. At 610, the transmission rate is switched from first data rate to second data rate and the multimedia packets are sent at the second data rate (or real-time data rate) in multicast mode.

In order to allow mobile device to transition from unicast mode to multicast mode, before sending the instruction, at 608, method 600 can ascertain, at 612, whether the new user (e.g., mobile device) is the most disadvantaged user in the multicast group. To make this determination, transmission parameters can be reviewed, such as QAM alphabet level and coding rate and from a recent rate at which NACKs have been received. In some cases, it might be advantageous to shift the transmission parameters of the multicast group down to the level of the new (most disadvantaged) joining device. If this is not performed, then the new joining device might cause the level of NACKs in the multicast group to increase. If the new joining user is severely disadvantaged, the number of NACKs allowed per packet may be insufficient to close the link. If mobile device is not the most disadvantaged ("NO") and there is a multicast group that can be joined, the instruction is sent, at 608. However, if mobile device is the most disadvantaged user ("YES"), device should not join the multicast group and device is kept on unicast, at 614. The transmissions to mobile device are sent at second data rate, which can be a real-time rate, at 610. If there is no multicast group to join, mobile device can continue to receive the multimedia content in unicast mode at second data rate.

In accordance with some aspects, a computer program product can include a computer-readable medium that comprises codes for carrying out various aspects. For example, computer-readable medium can include a first set of codes for causing a computer to convey a first subset of packets of a broadcast multimedia to a mobile device at rates that are higher than real-time rates. Also included is a second set of codes for causing the computer to begin to convey a second subset of packets of broadcast multimedia to the mobile device at the real-time rates if a buffer of the mobile device has reached a threshold length. Further, computer-readable medium can include a third set of codes for causing the computer to automatically convey a third subset of packets of broadcast multimedia to the mobile device at higher than real-time rates if the buffer of the mobile device has dropped below the threshold length. The unicast mode is utilized to convey the first subset of packets of broadcast multicast at higher than real-time rates. According to some aspects, unicast mode or multicast mode are utilized to convey the packets of broadcast multicast at real-time rates as a function of parameters of the mobile device or a communications environment.

Figure 7:
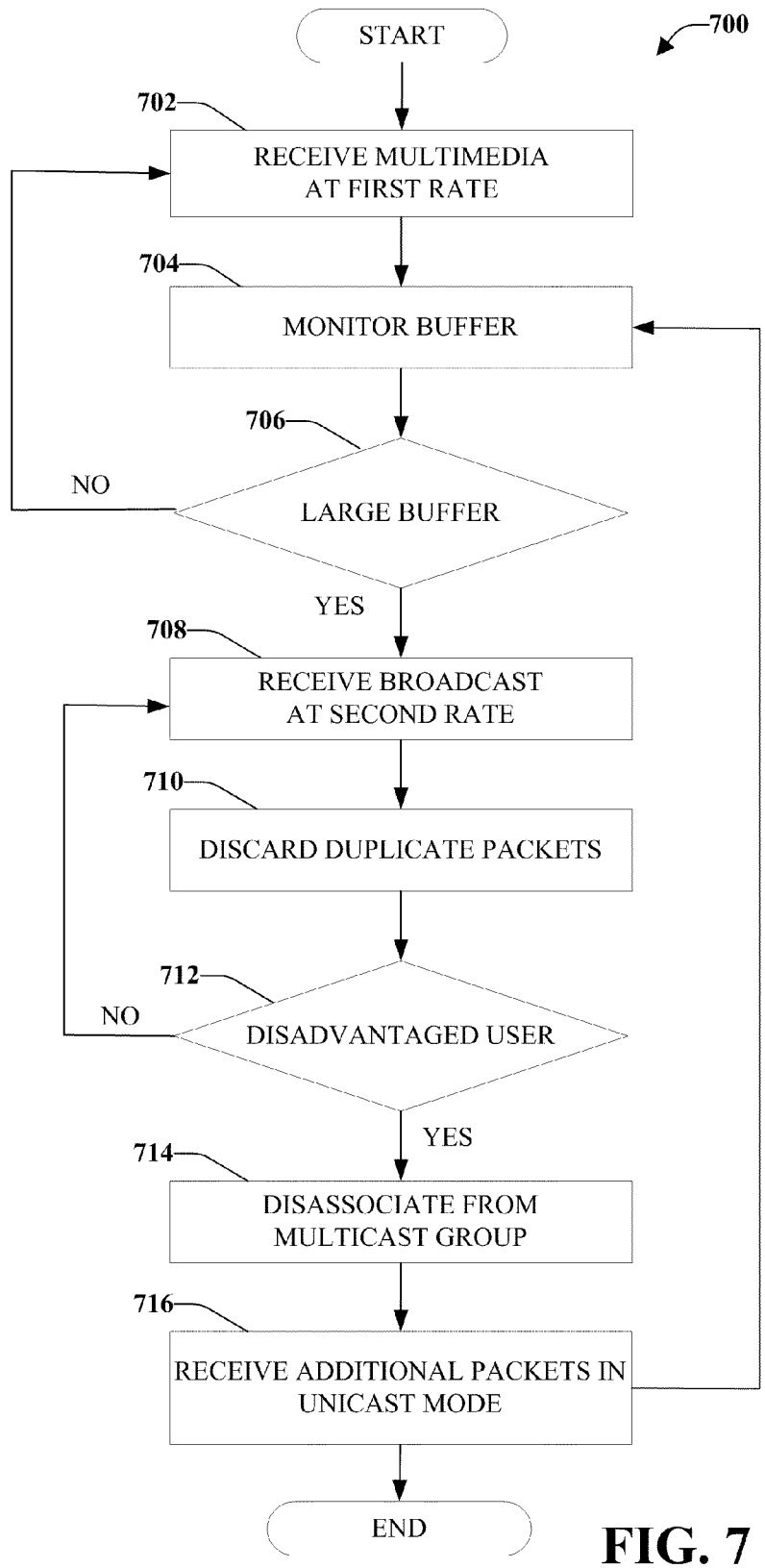
FIG. 7 illustrates a method for transitioning between unicast mode and multicast mode in order to receive broadcast multimedia, according to an aspect.

FIG. 7 illustrates a method 700 for transitioning from unicast mode to multicast mode in order to receive broadcast multimedia, according to an aspect. Method 700 can be performed by a mobile device and begins with receiving, at 702, packets of broadcast multimedia at a first data rate. The broadcast multimedia is received in unicast mode. A buffer associated with mobile device is monitored, at 704. To mitigate problems of timing, it can be desirable to have the buffer of the device joining a multicast group to be slightly larger than the buffers of the N multicast receivers. Thus, at 706, a determination is made whether the buffer length is at or above a threshold length, such as a first threshold length. If not at or above the threshold length ("NO"), method 700 continues, at 702, with receipt of multimedia at first data rate and monitoring of the buffer, at 704.

If the determination, at 706 is that the buffer length is at or above the threshold length ("YES"), device starts to receive the multimedia in multicast mode at a second data rate, at 708. Since the buffer length is longer than is usually necessary, the joining device will observe that the first few packets received from the multicast transmission are duplicate packets that have already been received. These packets are discarded, at 710, and device will start to add packets to the buffer that are fresh. In this manner, the existing multicast group is joined in a seamless manner that is transparent to the user.

If device is transitioning from one sector to another sector (or from one cell to another cell), mobile device uses the unicast mode in the sector being entered regardless of whether device was in unicast mode or multicast mode in the sector being exited. Since mobile device has a long buffer, method 700 can perform handoff in a simple manner and, further, the handoff can be performed at the IP layer.

If mobile device measures that new sector (e.g., second sector) is better than old sector (e.g., first sector), mobile device simply signals the sector being exited to break the connection and mobile device establishes a new connection in new sector. In the several seconds that elapse before the connection is established, mobile device might deplete a small percent of buffer, therefore, the initial transmission after connection is made can be at faster than real time rates so that mobile device can replenish its buffer. Therefore, method 700 can include deciding to handoff from the first sector to the second sector, breaking a connection with the first sector, and establishing a new connection with the second sector. The new connection is established in unicast mode. Once mobile device is securely in unicast mode with the desired buffer length, the base station (new sector) will determine whether to move mobile device to multicast mode (if there is one or more other device consuming the same source).

In accordance with some aspects, a user may travel to an area that has a connectively issue that is not adequate and mobile device cannot close the link and the user stays in that area. Mobile device may or may not be able to reliably signal to the base station. If device is in unicast mode, mobile device might start depleting the buffer and can attempt to reestablish a connection to the base station (at least periodically). When mobile device does establish the connection and the buffer has not been completely depleted, mobile device signals the last good packet available and the server will begin to transmit at higher than real-time rates until the buffer is rebuilt and beginning with the succeeding packets the mobile device has not yet received.

On the other hand, if mobile device was part of a multicast group when it went out of service, mobile device should be separated from the multicast group to prevent mobile device from dragging the remainder of the multicast group down with mobile device. Therefore, method can continue, at 712, by determining if mobile device is a most disadvantaged user in a multicast group. This determination can include ascertaining a maximum number of negative acknowledgments have been issued for n packets. In accordance with some aspects, the determination can include ascertaining that for m packets a CRC has failed.

If mobile device is not the most disadvantaged user ("NO"), method 700 continues, at 708, with receiving at the mobile device additional packets at second data rate. If mobile device is the most disadvantaged user ("YES"), at 714, mobile device disassociates from the multicast group automatically. Additional packets are received, at 716, in a unicast mode at first data rate and method 700 continues, at 704 with monitoring the buffer until the buffer length is at or above the threshold length, at which time mobile device can rejoin the multicast group (or a different multicast group).

In accordance with some aspects, mobile device should have a rule or policy under which mobile device will consider itself no longer part of the multicast group and will try to reestablish a unicast mode, as discussed above, before trying to rejoin the multicast group (or another multicast group). The rule or policy might be, for example, that mobile device is no longer part of the multicast group if mobile device has issued a maximum number of NACKs for the last n packets. In another example, the rule or policy might be that if the CRC failed on the last m packets, then mobile device is no longer part of the multicast group.

In accordance with some aspects, a computer program product can include a computer-readable medium that comprises codes for carrying out various aspects. For example, computer-readable medium can include a first set of codes for causing a computer to receive a first subset of a plurality of broadcast multimedia packets at a first data rate. Also included can be a second set of codes for causing the computer to transmit a message that indicates a buffer length has reached or exceeded a first threshold length. A third set of codes for causing the computer to receive a second subset of the plurality of broadcast multimedia packets at a second data rate can also be included. Additionally, computer-readable medium can include a fourth set of codes for causing the computer to receive a third subset of the plurality of broadcast multimedia packets at first data rate if the buffer length drops below the first threshold length. The first subset and the third subset are received in unicast mode. The second subset is received in unicast mode or multicast mode. If the second subset is received in multicast mode, the computer-readable medium further includes a fifth set of codes for causing the computer to disassociate from a multicast group before the fourth set of codes causes the computer to receive the third subset of the plurality of broadcast multimedia packets.

Figure 8:
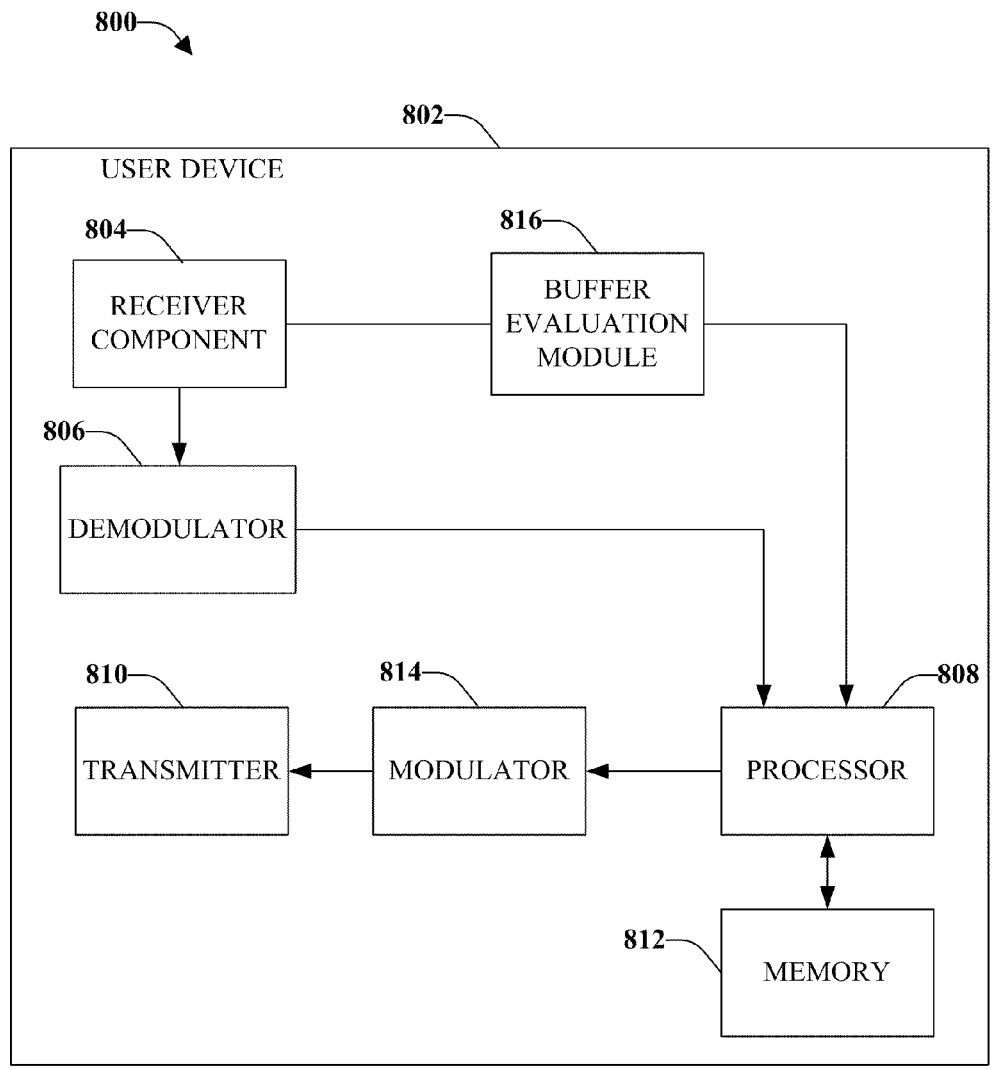
FIG. 8 illustrates a system that facilitates receiving broadcast multimedia through Internet capability in accordance with one or more of the disclosed aspects.

With reference now to FIG. 8, illustrated is a system that facilitates receiving broadcast multimedia through Internet capability in accordance with one or more of the disclosed aspects. System 800 can reside in a user device 802. System 800 comprises a receiver component 804 that can receive a signal from, for example, a receiver antenna. Receiver component 804 can perform typical actions thereon, such as filtering, amplifying, downconverting, etc. the received signal. The receiver component 804 can also digitize the conditioned signal to obtain samples. A demodulator 806 can obtain received symbols for each symbol period, as well as provide received symbols to a processor 808.

Processor 808 can be a processor dedicated to analyzing information received by receiver component 804 and/or generating information for transmission by a transmitter 810. In addition or alternatively, processor 808 can control one or more components of system 800, analyze information received by receiver component 804, generate information for transmission by transmitter 810, and/or control one or more components of user device 802. Processor 808 may include a controller component capable of coordinating communications with additional user devices.

User device 802 can additionally comprise memory 812 operatively coupled to processor 808. Memory 812 can store information related to coordinating communications and any other suitable information. Memory 812 can additionally store protocols associated with receiving multicast information. User device 802 can further comprise a symbol modulator 814, wherein transmitter 810 transmits the modulated signal.

Receiver component 804 is further operatively coupled to a buffer evaluation module 816 that is configured to monitor a buffer length and determine if the buffer length is at or above one or more buffer threshold lengths. If the buffer length is at or above a buffer threshold length, multimedia information can be received at an average real-time data rate. If the buffer length is below the buffer threshold length, the multimedia information can be received at high data rates. The multimedia information can be received in unicast mode at the high data rates and in unicast or multicast mode at the real time data rates. For example, if buffer length is below a first threshold length, packets are sent at a first data rate. If buffer length is at or above first threshold length and below a second threshold length, packets are sent at a second data rate. If buffer length is at or above second threshold length and below a third threshold length, packets are sent at a third data rate, and so forth.

Figure 9:
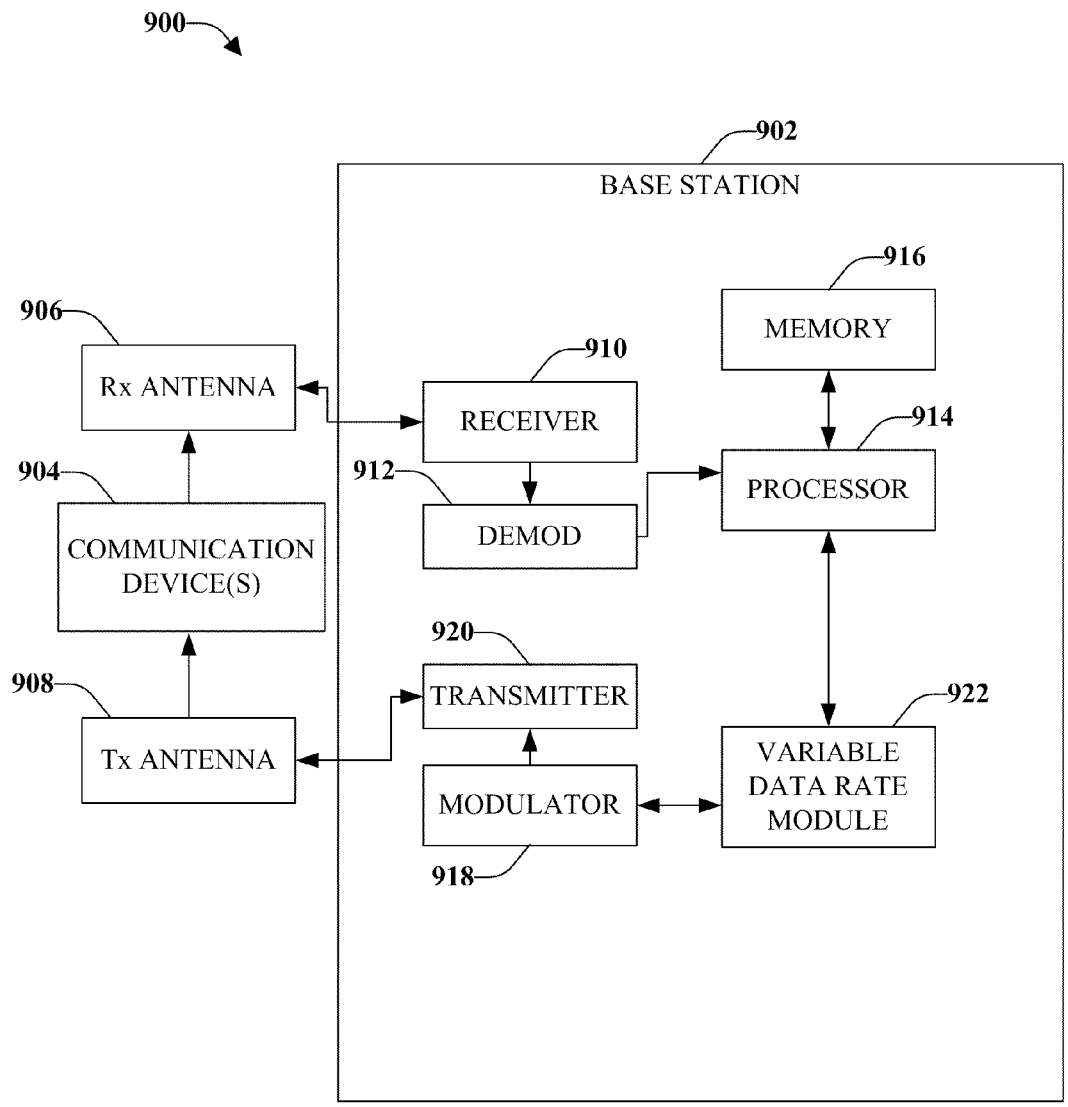
FIG. 9 illustrates a system that facilitates transmitting broadcast multimedia through Internet capability in accordance with one or more of the disclosed aspects.

FIG. 9 is an illustration of a system 900 that facilitates transmitting broadcast multimedia through Internet capability in accordance with one or more of the disclosed aspects. System 900 comprises an access point or base station 902. As illustrated, base station 902 receives signal(s) from one or more communication devices 904 (e.g., user device) by a receive antenna 906, and transmits to the one or more communication devices 904 through a transmit antenna 908.

Base station 902 comprises a receiver 910 that receives information from receive antenna 906 and is operatively associated with a demodulator 912 that demodulates received information. Demodulated symbols are analyzed by a processor 914 that is coupled to a memory 916 that stores information related to transmitting multimedia in a communications network. A modulator 918 can multiplex the signal for transmission by a transmitter 920 through transmit antenna 908 to communication devices 904.

Processor 914 is further coupled to a variable data rate module 922 that is configured to transmit the multimedia as a function of a buffer length of a device receiving the multimedia. If the buffer length is below a buffer threshold length the multimedia can be transmitted at high (or very high) data rates. If the buffer length is at or above the buffer threshold length, the multimedia can be transmitted at a slower rate, such as a real-time data rate. Further, the data can be transmitted at variable, intermediate rates between the very high data rate and the real-time data rate as a function of multiple buffer threshold lengths.

Figure 10:
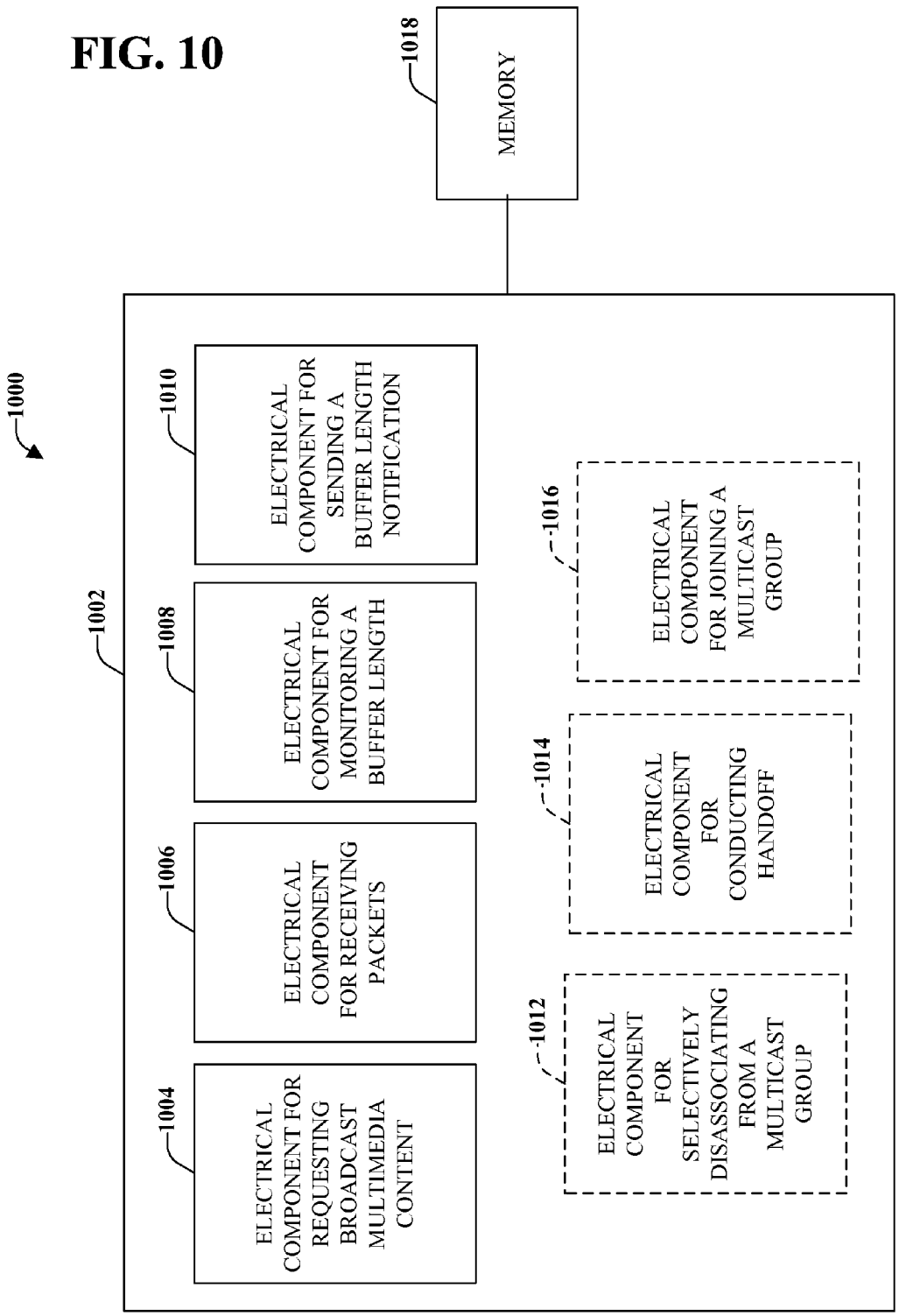
FIG. 10 illustrates an example system that receives broadcast multimedia in a communications network, according to an aspect.

With reference to FIG. 10, illustrated is an example system 1000 that receives broadcast multimedia in a communications network, according to an aspect. For example, system 1000 may reside at least partially within a mobile device. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 may include an electrical component 1004 for requesting broadcast multimedia. The broadcast multimedia comprises a plurality of packets. Also included is an electrical component 1006 for receiving a first subset of the plurality of packets in unicast mode at a first data rate and an electrical component 1008 for monitoring a buffer length. Logical grouping 1002 also includes an electrical component 1010 for sending a first notification when a buffer length is at or above a threshold length. Electrical component 1006 for receiving obtains a second subset of the plurality of packets at a second data rate. The second subset of the plurality of packets are received at the second data rate in unicast mode if there is no multicast group in the communications network or if mobile device is a most disadvantaged user.

In accordance with some aspects, the second subset of the plurality of packets are received at the second data rate in multicast mode. Logical grouping 1002 includes an electrical component 1012 for selectively disassociating from a multicast group if the buffer length drops below the first threshold length. Electrical component 1006 for receiving obtains a third subset of the plurality of packets in unicast mode at the first data rate.

According to some aspects, first data rate is a high data rate and second data rate is an intermediate data rate. Electrical component 1008 for monitoring evaluates buffer length as second subset of the plurality of packets are received. Electrical component 1010 for sending transmits a second notification when buffer length is at or above a second threshold length. Further, electrical component 1006 for receiving obtains a third set of packets at a third data rate.

In according with some aspects, first data rate is a high data rate and the first subset of the plurality of packets are received in unicast mode and second data rate is a real-time data rate and second subset of the plurality of packets are received in a multicast mode. Logical grouping 1002 also includes an electrical component 1014 for conducting handoff. Electrical component 1008 for monitoring buffer length determines, after handoff, buffer length is below the first threshold length. Electrical component 1006 for receiving obtains a third set of packets at first data rate in unicast mode. Electrical component 1010 for sending conveys a second notification when buffer length is at or above the first threshold length. Logical grouping 1002 also include an electrical component 1016 for joining a multicast group as a function of a received instruction to join multicast group. Electrical component 1006 for receiving obtains a fourth set of packets in the multicast mode at the second data rate.

Additionally, system 1000 can include a memory 1018 that retains instructions for executing functions associated with electrical components 1004-1016 or other components. While shown as being external to memory 1018, it is to be understood that one or more of electrical components 1004-1016 may exist within memory 1018.

Figure 11:
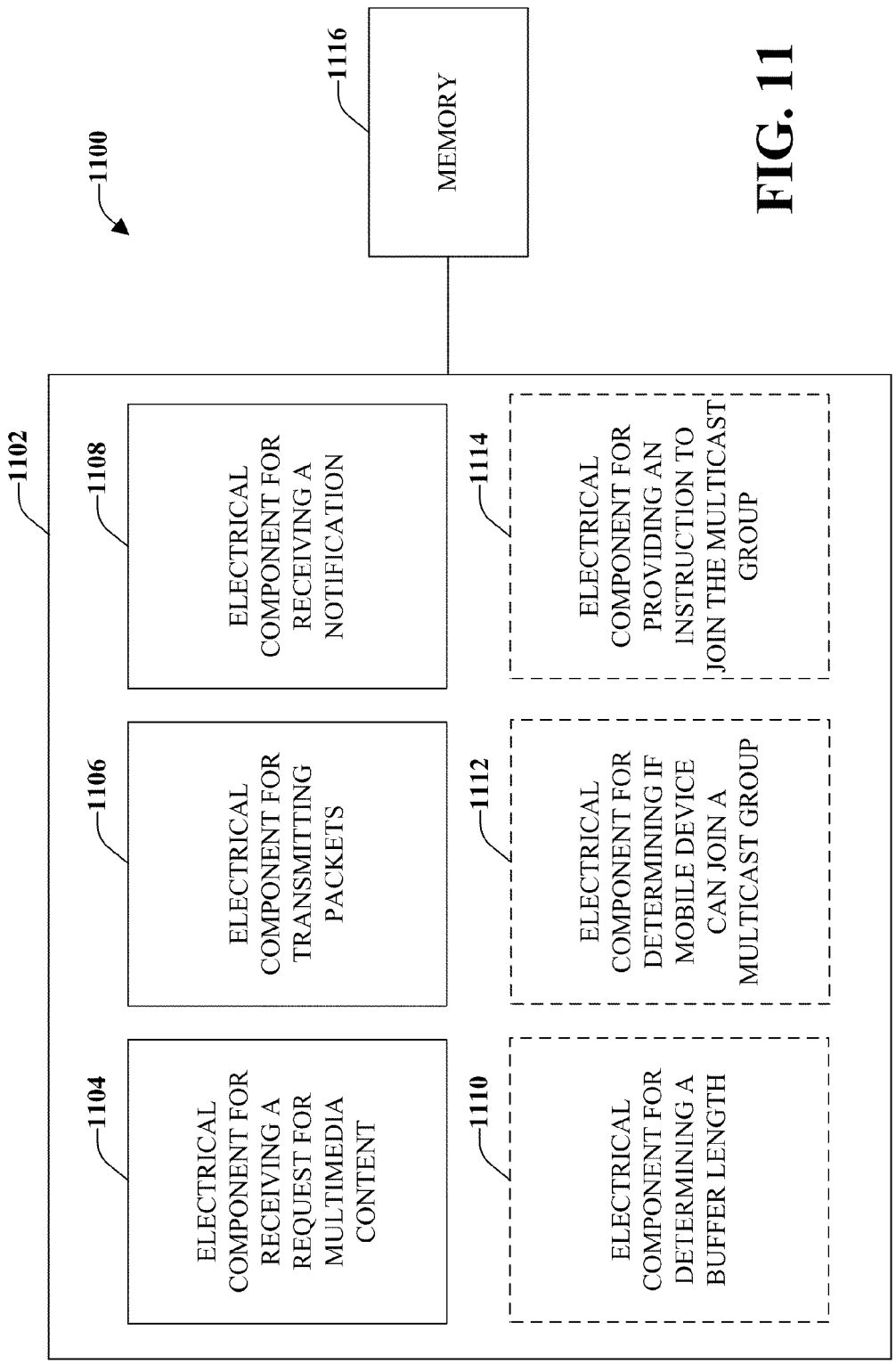
FIG. 11 illustrates an example system that conveys broadcast multimedia in a communications environment, according to an aspect.

FIG. 11 illustrates an example system 1100 that conveys broadcast multimedia in a communications environment, according to an aspect. System 1100 may reside at least partially within a base station. System 1100 is represented as including functional blocks, which may be functional blocks that represent functions implemented by a processor, software, or combination thereof (e.g., firmware).

System 1100 includes a logical grouping 1102 of electrical components that can act separately or in conjunction. Logical grouping 1102 may include an electrical component 1104 for receiving from a mobile device a request for multimedia content. Also included is an electrical component 1106 for initially transmitting packets of the multimedia content at a first data rate in unicast mode. Further, logical grouping 1102 includes an electrical component 1108 for receiving a notification related to a buffer length of mobile device. For example, electrical component 1108 receives a first notification that buffer length is at or above a first threshold length and electrical component 1106 sends additional packets of the multimedia content at a second data rate. The additional packets are sent in multicast mode or unicast mode as a function of parameters of the communications environment or the mobile device.

In accordance with some aspects, logical grouping includes an electrical component 1110 for determining the buffer length of the mobile device is below the first threshold length. Electrical component 1106 for sending additional packets of the multimedia content sends further packets of the multimedia content at the first data rate in unicast mode until the buffer length is at or above the first threshold length.

According to some aspects, first data rate is a high data rate and second data rate is an intermediate data rate. Electrical component 1108 obtains a second notification that buffer length of mobile device is at or above a second threshold length and electrical component 1106 transmits a third set of packets at a third data rate.

Alternatively or additionally, logical grouping 1102 includes an electrical component 1112 for determining if mobile device can join a multicast group. Also included is an electrical component 1114 for providing the mobile device an instruction to join the multicast group, electrical component 1108 sends the additional packets in multicast mode. In accordance with some aspects, electrical component 1112 for determining if mobile device can join the multicast group ascertains if the mobile device is a most disadvantaged user, wherein the mobile device cannot join the multicast group if the mobile device is the most disadvantaged user.

Additionally, system 1100 can include a memory 1116 that retains instructions for executing functions associated with electrical components 1104, 1106, 1108, 1110, 1112, and 1114 or other components. While shown as being external to memory 1116, it is to be understood that one or more of electrical components 1104, 1106, 1108, 1110, 1112, and 1114 may exist within memory 1116.

Figure 12:
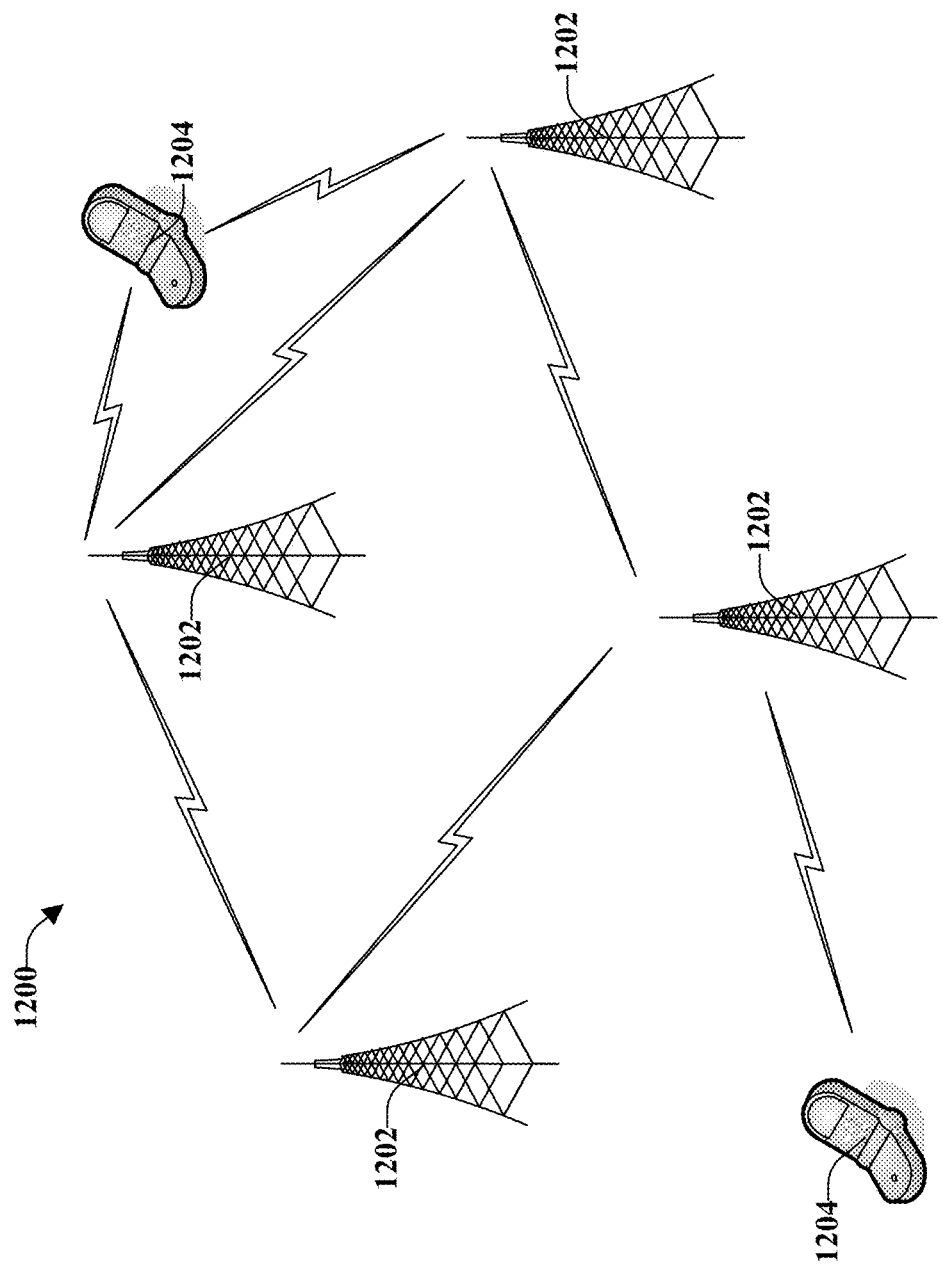
FIG. 12 illustrates a communication system in accordance with various aspects presented herein.

Referring now to FIG. 12, illustrated is a communication system 1200 in accordance with various aspects presented herein. Communication system 1200 can comprise one or more base stations 1202 in one or more sectors that receive, transmit, repeat, and so forth, wireless communication signals to each other and/or to one or more mobile devices 1204. Each base station 1202 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 1204 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

Figure 13:
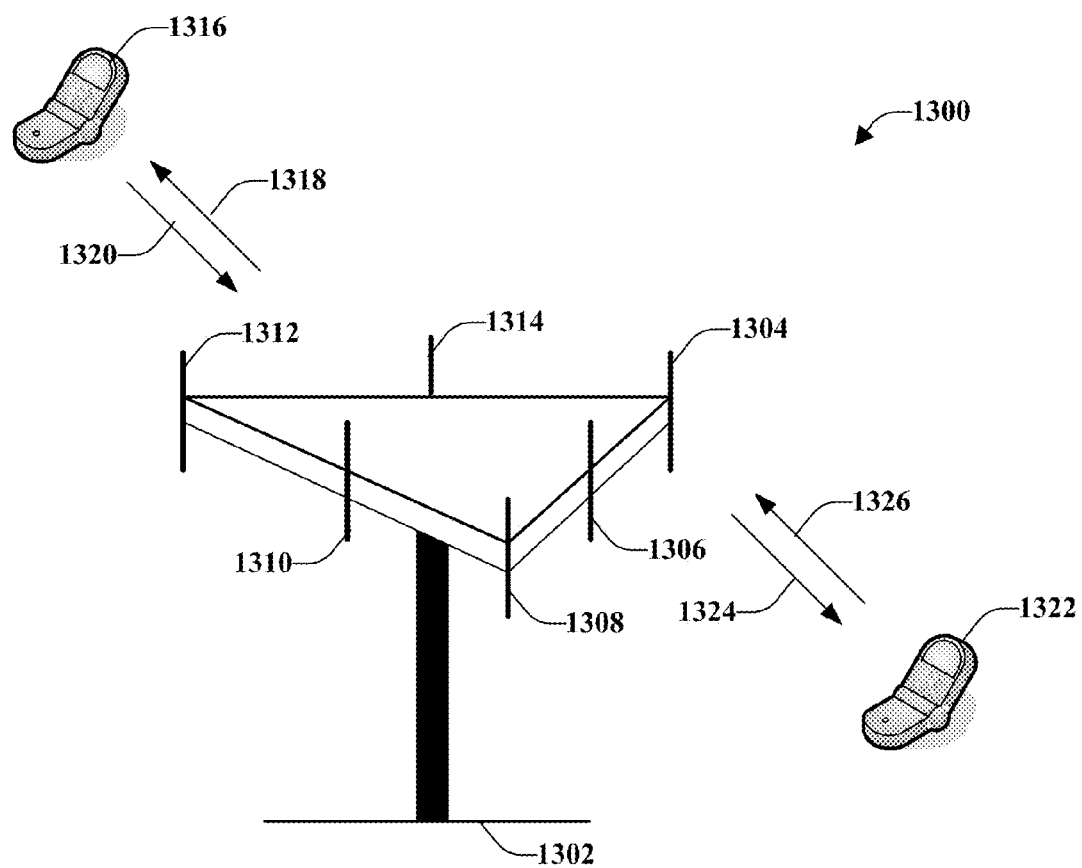
FIG. 13 illustrates a multiple access wireless communication system according to one or more aspects.

Referring now to FIG. 13, a multiple access wireless communication system 1300 according to one or more aspects is illustrated. A wireless communication system 1300 can include one or more base stations in contact with one or more user devices. Each base station provides coverage for a plurality of sectors. A three-sector base station 1302 is illustrated that includes multiple antenna groups, one including antennas 1304 and 1306, another including antennas 1308 and 1310, and a third including antennas 1312 and 1314. According to the figure, only two antennas are shown for each antenna group, however, more or fewer antennas may be utilized for each antenna group. Mobile device 1316 is in communication with antennas 1312 and 1314, where antennas 1312 and 1314 transmit information to mobile device 1316 over forward link 1318 and receive information from mobile device 1316 over reverse link 1320. Forward link (or downlink) refers to the communication link from the base stations to mobile devices, and the reverse link (or uplink) refers to the communication link from mobile devices to the base stations. Mobile device 1322 is in communication with antennas 1304 and 1306, where antennas 1304 and 1306 transmit information to mobile device 1322 over forward link 1324 and receive information from mobile device 1322 over reverse link 1326. In a FDD system, for example, communication links 1318, 1320, 1324, and 1326 might utilize different frequencies for communication. For example, forward link 1318 might use a different frequency than the frequency utilized by reverse link 1320.

Each group of antennas and/or the area in which they are designated to communicate may be referred to as a sector of base station 1302. In one or more aspects, antenna groups each are designed to communicate to mobile devices in a sector or the areas covered by base station 1302. A base station may be a fixed station used for communicating with the terminals.

In communication over forward links 1318 and 1324, the transmitting antennas of base station 1302 can utilize beamforming in order to improve a signal-to-noise ratio of forward links for the different mobile devices 1316 and 1322. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

Figure 14:
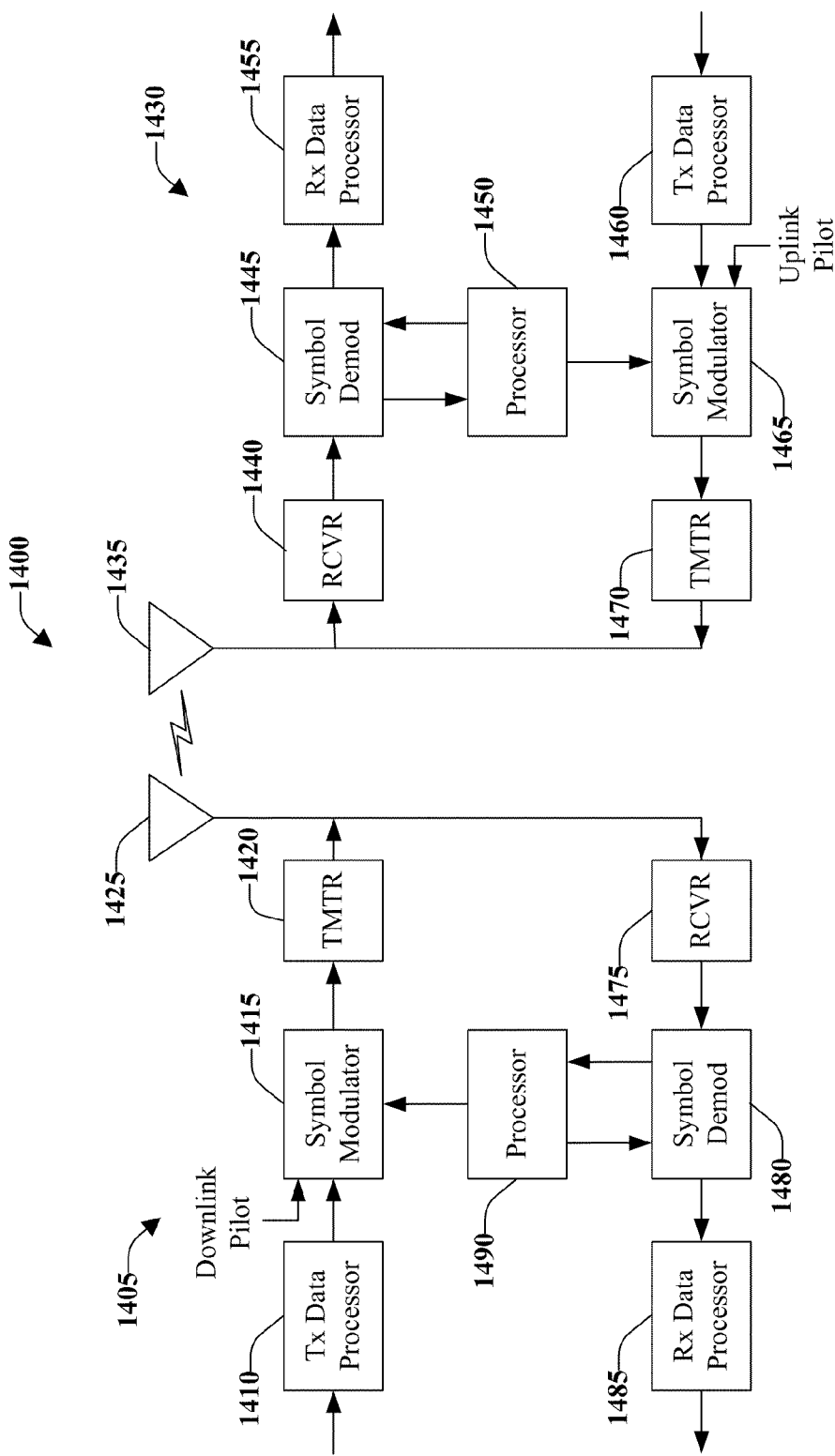
FIG. 14 illustrates an exemplary wireless communication system, according to various aspects.

FIG. 14 illustrates an exemplary wireless communication system 1400, according to various aspects. Wireless communication system 1400 depicts one base station and one terminal for sake of brevity. However, it is to be appreciated that wireless communication system 1400 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 14, on a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1415 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 obtains N received symbols and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink.

Processors 1490 and 1450 direct (e.g., control, coordinate, manage, . . . ) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1490 and 1450.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for receiving a broadcast multimedia, comprising: employing a processor to implement the method, comprising:
receiving a first set of packets of the broadcast multimedia at a mobile device at a first data rate, wherein a transmission is in a unicast mode;
monitoring a buffer length;
sending a first notification when the buffer length is at or above a first threshold length;
upon determining the mobile device is not a most disadvantaged user, receiving at the mobile device an instruction to join a multicast group and a second set of packets at a second data rate in a multicast mode; and
upon determining the mobile device is the most disadvantaged user by at least ascertaining that a maximum number of negative acknowledgements has been issued for n packets by the mobile device, receiving at the mobile device the second set of packets at the second data rate in the unicast mode;
wherein, if it is determined that the mobile device is the most disadvantaged user while receiving the second set of packets at the second data rate in the multicast mode, then disassociating from the multicast group automatically and receiving the second set of packets in the unicast mode at the first data rate.

2. The method of claim 1, wherein the second set of packets is received from a first sector, the method further comprising:
deciding to handoff from the first sector to a second sector;
breaking a connection with the first sector; and
establishing a new connection with the second sector, wherein the connection is established in the unicast mode.

3. The method of claim 1, further comprising:
continuing to monitor the buffer length;
transmitting a second notification if the buffer length has dropped below the first threshold length; and
receiving a third set of packets at the first data rate until the buffer length is at or above the first threshold length.

4. The method of claim 1, wherein the first data rate is a high data rate and the second data rate is an intermediate data rate, the method further comprising:
continuing to monitor the buffer length as the second set of packets is received;
sending a second notification when the buffer length is at or above a second threshold length; and
receiving a third set of packets at a third data rate.

5. The method of claim 1, wherein the first data rate is a high data rate and the first set of packets is received in the unicast mode and the second data rate is an average real-time data rate and the second set of packets is received in the multicast mode, the method further comprising:
determining, after a handoff, the buffer length is below the first threshold length;
receiving a third set of packets at the first data rate in the unicast mode;
sending a second notification when the buffer length is at or above the first threshold length;
joining a multicast group as a function of the received instruction to join the multicast group; and
receiving a fourth set of packets in the multicast mode at the second data rate.

6. The method of claim 1, wherein determining the mobile device is the most disadvantaged user in the multicast group, comprising:
ascertaining that for m packets a Cyclic Redundancy Check (CRC) has failed.

7. A communications apparatus, comprising:
a memory that retains instructions related to:

requesting a broadcast multimedia, wherein the broadcast multimedia comprises a plurality of packets, receiving a first subset of the plurality of packets at a first data rate, monitoring a buffer length, sending a first notification when the buffer length is at or above a first threshold length, upon determining the communications apparatus is not a most disadvantaged user, receiving an instruction to join a multicast group and receiving a second subset of the plurality of packets at a second data rate in a multicast mode, and upon determining the communications apparatus is the most disadvantaged user by at least ascertaining that a maximum number of negative acknowledgements has been issued for n packets by the communication apparatus, receiving the second subset of packets at the second data rate in a unicast mode; and wherein, if it is determined that the mobile device is the most disadvantaged user while receiving the second subset of packets at the second data rate in the multicast mode, then disassociating from the multicast group automatically and receiving the second subset of packets in the unicast mode at the first data rate;

a processor, coupled to the memory, configured to execute the instructions retained in the memory.

8. The communications apparatus of claim 7, wherein the subset of the plurality of packets received at the first data rate are received in the unicast mode and the second subset of the plurality of packets received at the second data rate are received in the unicast mode or in the multicast mode as a function of parameters of the communications apparatus or parameters of a communications network.

9. The communications apparatus of claim 7, wherein the first data rate is a high data rate and the second data rate is an intermediate data rate, the memory retains further instructions related to monitoring the buffer length as the second subset of the plurality of packets are received, transmitting a second notification when the buffer length is at or above a second threshold length, and receiving a third set of packets at a third data rate.

10. The communications apparatus of claim 7, wherein the first data rate is a high data rate and the first subset of the plurality of packets is received in the unicast mode and the second data rate is an average real-time data rate and the second subset of the plurality of packets is received in the multicast mode, the memory retains further instructions related to performing a handoff, determining the buffer length is below the first threshold length after the handoff, receiving a third set of packets at the first data rate in the unicast mode, sending a second notification when the buffer length is at or above the first threshold length, joining the multicast group as a function of a received instruction to join the multicast group, and receiving a fourth set of packets in the multicast mode at the second data rate.

11. The communications apparatus of claim 7, wherein the second subset of the plurality of packets is received in the multicast mode, the memory retains instructions related to monitoring the buffer length as the second subset of the plurality of packets is received at the second data rate, switching from the multicast mode to the unicast mode if the buffer length is below the first threshold length, and receiving a third subset of packets in the unicast mode at the first data rate until the buffer length is at or above the first threshold length.

12. The communications apparatus of claim 7, wherein determining the communications apparatus is the most disadvantaged user further comprises determining that for m packets a CRC has failed.

13. A communications apparatus that receives a broadcast multimedia in a communications network, comprising:

means for requesting the broadcast multimedia, wherein the broadcast multimedia comprises a plurality of packets;

means for receiving a first subset of the plurality of packets in a unicast mode at a first data rate;

means for monitoring a buffer length;

means for sending a first notification when the buffer length is at or above a first threshold length;

upon determining the communications apparatus is not a most disadvantaged user, means for receiving an instruction to join a multicast group and a second subset of the plurality of packets at a second data rate in a multicast mode;

upon determining the communications apparatus is the most disadvantaged user by at least ascertaining that a maximum number of negative acknowledgements has been issued for n packets by the communication apparatus, means for receiving the second subset of packets at the second data rate in the unicast mode;

means for determining that the mobile device is the most disadvantaged user while receiving the second subset of packets at the second data rate in the multicast node;

means for disassociating from the multicast group automatically; and means for receiving the second subset of packets in the unicast mode at the first data rate.

14. The communications apparatus of claim 13, wherein the second subset of the plurality of packets are received at the second data rate in the unicast mode if there is no multicast group in the communications network.

15. The communications apparatus of claim 13, wherein when the second subset of the plurality of packets are received at the second data rate in the multicast mode, the communications apparatus further comprising:

means for selectively disassociating from the multicast group if the buffer length is below the first threshold length, and means for receiving a third subset of the plurality of packets in the unicast mode at the first data rate.

16. The communications apparatus of claim 13, wherein the first data rate is a high data rate and the second data rate is an intermediate data rate, the means for monitoring a buffer length comprises evaluating the buffer length as the second subset of the plurality of packets are received, the means for sending comprises transmitting a second notification when the buffer length is at or above a second threshold length, and the means for receiving comprises obtaining a third set of packets at a third data rate.

17. The communications apparatus of claim 13, wherein the first data rate is a high data rate and the first subset of the plurality of packets are received in the unicast mode and the second data rate is a real-time data rate and the second subset of the plurality of packets are received in the multicast mode, the communications apparatus further comprising: means for conducting a handoff, wherein the means for monitoring the buffer length comprises determining, after a handoff, the buffer length is below the first threshold length, the means for receiving comprises obtaining a third set of packets at the first data rate in the unicast mode, the means for sending comprises providing a second notification when the buffer length is at or above the first threshold length, and means for joining the multicast group as a function of the received instruction to join the multicast group, wherein the means for receiving comprises obtaining a fourth set of packets in the multicast mode at the second data rate.

18. A computer program product, comprising:
a non-transitory computer-readable medium comprising:
a first set of codes for causing a computer to receive a first subset of a plurality of broadcast multimedia packets at a first data rate;
a second set of codes for causing the computer to transmit a message that indicates a buffer length has reached or exceeded a first threshold length;
a third set of codes for causing the computer to receive a second subset of the plurality of broadcast multimedia packets at a second data rate, comprising:
upon determining the computer is not a most disadvantaged user, receiving an instruction to join a multicast group and receiving the second subset of the plurality of packets in a multicast mode, and
upon determining the computer is the most disadvantaged user by at least ascertaining that a maximum number of negative acknowledgements has been issued for n packets by the computer, receiving the second subset of packets in a unicast mode; and
a fourth set of codes for causing the computer to receive a third subset of the plurality of broadcast multimedia packets at the first data rate if the buffer length is below the first threshold length;
wherein, if it is determined that the mobile device is the most disadvantaged user while receiving the second subset of packets at the second data rate in the multicast mode, then a fifth set of codes for causing the computer to disassociate from the multicast group automatically and receive the second subset of packets in the unicast mode at the first data rate.

19. The computer program product of claim 18, wherein the first subset and the third subset are received in unicast mode.

20. The computer program product of claim 18, wherein when the second subset is received in the multicast mode, the computer-readable medium further comprising: a fifth set of codes for causing the computer to disassociate from the multicast group before the fourth set of codes causes the computer to receive the third subset of the plurality of broadcast multimedia packets.

21. At least one processor configured to receive Internet radio broadcast over a cellular link, comprising:
a first module for receiving a first subset of packets for the Internet radio broadcast over a unicast transmission at a data rate that is higher than a real-time rate;
a second module for sending a notification when a buffer length is at or above a threshold length; and
a third module for receiving a second subset of packets for the Internet radio broadcast at the real-time rate, wherein:
upon determining the processor is not a most disadvantaged user, the processor is configured to receive an instruction to join a multicast group and receive the second subset of packets in a multicast mode, and
upon determining the processor is the most disadvantaged user by at least ascertaining that a maximum number of negative acknowledgements has been issued for n packets by the processor, the processor is configured to receive the second subset of packets in a unicast mode;
wherein, if it is determined that the mobile device is the most disadvantaged user while receiving the second subset of packets at the second data rate in the multicast mode, then the processor is configured to disassociate from the multicast group automatically and receive the second subset of packets in the unicast mode at the first data rate.

22. The at least one processor of claim 21, further comprising:
a fourth module for receiving a third subset of packets for the Internet radio broadcast at higher than the real-time rate in the unicast mode if the buffer length is below the threshold length.

23. The at least one processor of claim 21, wherein when the second subset of packets are received over the multicast mode, the at least one processor further comprising:
a fourth module for disassociating from the multicast group if the buffer length is below the threshold length; and
a fifth module for receiving a third subset of packets in the unicast mode at the data rate that is higher than the real-time rate.

24. A method for delivering a broadcast multimedia, comprising:
employing a processor to implement the method, comprising:
receiving from a mobile device a request for the broadcast multimedia;
transmitting a first set of broadcast multimedia packets in a unicast mode at a first data rate;
receiving from the mobile device a first notification that a first buffer threshold length has been reached; and
determining whether the mobile device can join a multicast group, comprising:
upon determining the mobile device is not a most disadvantaged user, providing the mobile device an instruction to join the multicast group, and transmitting a second set of broadcast multimedia packets at a second data rate in a multicast mode, and
upon determining the mobile device is the most disadvantaged user by at least ascertaining that a maximum number of negative acknowledgements has been issued for n packets by the mobile device, transmitting the second set of broadcast multimedia packets at the second data rate in a unicast mode;
wherein, if it is determined that the mobile device is the most disadvantaged user while receiving the second set of broadcast multimedia packets at the second data rate in the multicast mode, then disassociating the mobile device from the multicast group automatically and transmitting to the mobile device the second set of broadcast multimedia packets in the unicast mode at the first data rate.

25. The method of claim 24, wherein when the second set of broadcast multimedia packets are transmitted at the second data rate in the unicast mode, the method further comprising:
receiving a second notification that a buffer length has dropped below the first buffer threshold length;
switching from the second data rate to the first data rate; and
sending a third set of broadcast multimedia packets at the first data rate in the unicast mode.

26. The method of claim 24, wherein the first data rate is a high data rate and the second data rate is an intermediate data rate,
the method further comprising:
receiving from the mobile device a second notification that a second threshold length has been reached; and
transmitting a third set of packets at a third data rate.

27. The method of claim 24, wherein the second set of broadcast multimedia packets are transmitted at the second data rate in the multicast mode to the multicast group that includes the mobile device,
the method further comprising:
receiving a second notification that a buffer length has dropped below the first buffer threshold length;
sending an instruction to the mobile device to disassociate from the multicast group; and
transmitting a third set of broadcast multimedia packets to the mobile device at the first data rate in the unicast mode.

28. A communications apparatus, comprising:
a memory that retains instructions related to:
sending multimedia to a mobile device at a first data rate in a unicast mode if a buffer length of the mobile device is below a first threshold length,
changing the first data rate to a second data rate based on a first indication that the buffer length is at or above the first threshold length, comprising:
upon determining the mobile device is not a most disadvantaged user, providing the mobile device an instruction to join a multicast group, and transmitting the multimedia at the second data rate in a multicast mode, and
upon determining the mobile device is the most disadvantaged user by at least ascertaining that a maximum number of negative acknowledgements has been issued for n packets by the mobile device, transmitting the multimedia at the second data rate in the unicast mode; and
wherein, if it is determined that the mobile device is the most disadvantaged user while receiving the multimedia at the second data rate in the multicast mode, then disassociating the mobile device from the multicast group automatically and transmitting to the mobile device the multimedia in the unicast mode at the first data rate;
a processor, coupled to the memory, configured to execute the instructions retained in the memory.

29. The communications apparatus of claim 28, wherein the memory retains instructions related to selecting the unicast mode or the multicast mode as a function of device parameters or network parameters.

30. The communications apparatus of claim 28, wherein the multimedia is sent at the second data rate in the multicast mode, the memory retains instructions related to receiving a second indication that the buffer length of the mobile device has dropped below the first threshold length and sending a plurality of additional packets of the multimedia to the mobile device at the first data rate in the unicast mode.

31. The communications apparatus of claim 28, wherein the first data rate is a high data rate and the second data rate is an intermediate data rate, the memory retains further instructions related to receiving from the mobile device a second notification that the buffer length is at or above a second threshold length and transmitting a third set of packets at a third data rate.

32. A communications apparatus that conveys a broadcast multimedia in a communications environment, comprising:
means for receiving from a mobile device a request for the broadcast multimedia;
means for transmitting packets of the broadcast multimedia at a first data rate in a unicast mode;
means for receiving a notification when a buffer length of the mobile device is at or above a first threshold length;
means for determining if the mobile device can join a multicast group, comprising:
upon determining the mobile device is not a most disadvantaged user, means for providing the mobile device an instruction to join the multicast group, and means for sending a plurality of additional packets of the broadcast multimedia at a second data rate in a multicast mode, and
upon determining the mobile device is the most disadvantaged user by at least ascertaining that a maximum number of negative acknowledgements has been issued for n packets by the mobile device, means for sending the plurality of additional packets of the broadcast multimedia at the second data rate in the unicast mode;
means for determining that the mobile device is the most disadvantaged user white receiving the second set of packets at the second data rate in the multicast mode;
means for disassociating the mobile device from the multicast group automatically; and
means for transmitting to the mobile device the second set of packets in the unicast mode at the first data rate.

33. The communications apparatus of claim 32, wherein the plurality of additional packets are sent in the multicast mode or the unicast mode as a function of parameters of the communications environment or the mobile device.

34. The communications apparatus of claim 32, further comprising:
means for determining the buffer length of the mobile device is below the first threshold length, wherein the means for transmitting packets of the broadcast multimedia at the first data rate in the unicast mode comprises means for sending further packets of the broadcast multimedia at the first data rate in the unicast mode until the buffer length is at or above the first threshold length.

35. The communications apparatus of claim 32, wherein the first data rate is a high data rate and the second data rate is an intermediate data rate, the means for receiving comprises means for obtaining a second notification that the buffer length is at or above a second threshold length and the means for transmitting packets sends a third set of packets at a third data rate.

36. A computer program product, comprising:
a non-transitory computer-readable medium comprising:
a first set of codes for causing a computer to convey a first subset of packets of a broadcast multimedia to a mobile device at rates that are higher than real-time rates;
a second set of codes for causing the computer to begin to convey a second subset of packets of the broadcast multimedia to the mobile device at the real-time rates if a buffer of the mobile device has reached a threshold length, wherein:
upon determining the mobile device is not a most disadvantaged user, the computer is configured to receive an instruction to join a multicast group and receive the second subset of packets in a multicast mode, and
upon determining the mobile device is the most disadvantaged user by at least ascertaining that a maximum number of negative acknowledgements has been issued for n packets by the mobile device, the computer is configured to receive the second subset of packets in a unicast mode; and
a third set of codes for causing the computer to automatically convey a third subset of packets of the broadcast multimedia to the mobile device at higher than the real-time rates if the buffer of the mobile device has dropped below the threshold length;
wherein, if it is determined that the mobile device is the most disadvantaged user while receiving the second subset of packets at the second data rate in the multicast mode, then a fourth set of codes for causing the computer to disassociate the mobile device from the multicast group automatically and transmit to the mobile device the second subset of packets in the unicast mode at the first data rate.

37. The computer program product of claim 36, wherein the unicast mode is utilized to convey the first subset of packets of broadcast multicast at higher than the real-time rates.

38. The computer program product of claim 36, wherein the unicast mode or the multicast mode is utilized to convey the second subset of packets of broadcast multicast at the real-time rates as a function of parameters of the mobile device or a communications environment.

39. At least one processor configured to transmit a broadcast multimedia at variable rates, comprising:
 a first module for sending the broadcast multimedia to a device at a high data rate if a buffer length of the device is below a threshold length;
 a second module for switching the high data rate to an average real-time data rate if the buffer length of the device is at or above the threshold length; and
 a third module for selectively allowing the device to join a multicast group,
 wherein upon determining the device is a most disadvantaged user of the multicast group by at least ascertaining that a maximum number of negative acknowledgements has been issued for n packets by the device, the broadcast multimedia is sent at the high data rate in a unicast mode, and upon determining the device is not the most disadvantaged user, an instruction is provided to the device for joining the multicast group, and the broadcast multimedia is sent at the average real-time data rate in a multicast mode;
 wherein, if it is determined that the mobile device is the most disadvantaged user while sending the broadcast multimedia at the average real-time data rate in the multicast mode, then disassociating the mobile device from the multicast group automatically and transmitting to the mobile device the broadcast multimedia in the unicast mode at the high data rate.

40. The at least one processor of claim 39, wherein the determining the device is the most disadvantaged user at least comprises determining the device does not join the multicast group.

* * * * *